US007584611B2

(12) United States Patent
Ariga et al.

(10) Patent No.: US 7,584,611 B2
(45) Date of Patent: Sep. 8, 2009

(54) CONTROL SYSTEM FOR HYDRAULIC CONSTRUCTION MACHINE

(75) Inventors: Nobuei Ariga, Tsuchiura (JP); Kazunori Nakamura, Tsuchiura (JP); Kouji Ishikawa, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 410 days.

(21) Appl. No.: 11/632,474

(22) PCT Filed: Nov. 18, 2005

(86) PCT No.: PCT/JP2005/021274

§ 371 (c)(1),
(2), (4) Date: Jan. 16, 2007

(87) PCT Pub. No.: WO2006/054711

PCT Pub. Date: May 26, 2006

(65) Prior Publication Data

US 2008/0072588 A1 Mar. 27, 2008

(30) Foreign Application Priority Data

Nov. 22, 2004 (JP) ............................ 2004-337896

(51) Int. Cl.
*F16D 31/02* (2006.01)

(52) U.S. Cl. .......................................... 60/431; 60/452

(58) Field of Classification Search .................. 60/431, 60/433, 452
See application file for complete search history.

(56) References Cited

U.S. PATENT DOCUMENTS

| | | | | |
|---|---|---|---|---|
| 4,697,418 | A | 10/1987 | Okabe et al. | |
| 5,525,043 | A * | 6/1996 | Lukich | 60/431 |
| 6,183,210 | B1 * | 2/2001 | Nakamura | 60/431 |
| 7,255,088 | B2 * | 8/2007 | Nakamura et al. | 123/352 |

FOREIGN PATENT DOCUMENTS

| | | |
|---|---|---|
| JP | 62-160331 | 7/1987 |
| JP | 2002-138965 | 5/2002 |
| JP | 2004-076649 | 3/2004 |
| JP | 2004-162816 | 6/2004 |
| JP | 2005-147040 | 6/2005 |

* cited by examiner

*Primary Examiner*—Michael Leslie
(74) *Attorney, Agent, or Firm*—Mattingly & Malur, P.C.

(57) ABSTRACT

When a mode selection command selects an economy mode, a mode selector 700*e* is turned on and outputs an engine revolution speed modification value ΔN0 (ΔN1=ΔN0) computed by an engine-revolution-speed modification value computing section 700*d*. A subtracter 700*f* subtracts the engine revolution speed modification value ΔN1 from a rated target revolution speed Nmax, thereby computing a target engine revolution speed NR2. The computing section 700*d* computes the engine revolution speed modification value ΔN0 depending on a pump delivery pressure mean value Pm. In a table stored in a memory, the relationship between Pm and ΔN0 is set such that when Pm is not higher than PA near a midpoint pressure, ΔN0 is 0 and when Pm exceeds PA, ΔN0 is increased with an increase of Pm. Thus, the revolution speed of a prime mover is reduced by mode selection so as to improve fuel economy.

8 Claims, 14 Drawing Sheets

CONTROL SYSTEM FOR HYDRAULIC CONSTRUCTION MACHINE

TECHNICAL FIELD

The present invention relates to a control system for a hydraulic construction machine. More particularly, the present invention relates to a control system for a hydraulic construction machine, such as a hydraulic excavator, which drives hydraulic actuators by a hydraulic fluid delivered from a hydraulic pump driven by a prime mover (engine), thereby performing necessary work, and which includes mode selection means for selecting a control mode for the prime mover and controlling an engine revolution speed.

BACKGROUND ART

In general, a hydraulic construction machine, such as a hydraulic excavator, includes a diesel engine as a prime mover. At least one variable displacement hydraulic pump is driven by the engine, and a plurality of hydraulic actuators are driven by a hydraulic fluid delivered from the hydraulic pump, thereby performing necessary work. The diesel engine is provided with input means, such as a throttle dial, for commanding a target revolution speed. In accordance with the target revolution speed, the fuel injection amount is controlled and the revolution speed is also controlled. Further, the hydraulic pump is provided with pump absorption torque control means for horsepower control. The pump absorption torque control means executes control such that, when pump delivery pressure rises, pump tilting is reduced to avoid pump absorption torque from increasing over a preset value (maximum absorption torque).

Also, in a hydraulic construction machine, such as a hydraulic excavator, it is generally practiced to provide mode selection means separately from input means, such as a throttle dial, for commanding a target revolution speed, and to control the engine revolution speed by setting a control mode (work mode), such as an economy mode, through the mode selection means. In the economy mode, the engine revolution speed is reduced and therefore fuel economy is improved.

JP-A-62-160331 discloses a technique that the relationship between the revolution speed of a prime mover and the displacement of a hydraulic pump is preset in plural sets, a working state is determined using various detection means, and one of the plural sets is selected in accordance with the determination result and a signal from a mode selection switch to automatically switch over a control mode, whereby the revolution speed of the prime mover and the displacement of the hydraulic pump are controlled so as to make the maximum delivery rate of the hydraulic pump adapted for the working state.

Patent Document 1: JP-A-62-160331

DISCLOSURE OF THE INVENTION

Problems to be Solved by the Invention

In a construction machine, such as a hydraulic excavator, the relationship between the delivery pressure and the delivery rate of a hydraulic pump is set as follows. The maximum displacement of the hydraulic pump is decided depending on an operating speed under a comparatively light load during, e.g., travel, swing, or midair operation, and the displacement of the hydraulic pump at a higher level of the pump delivery pressure is decided depending on the output horsepower of an engine.

Also, in a general economy mode, it is prevalent to slow down the engine revolution by a certain amount regardless of the operating situation of the construction machine. When the economy mode is selected in such a system, the delivery rate of the hydraulic pump is reduced in proportion to the slow-down of the engine revolution in spite of the maximum displacement being decided in consideration of the performance under the light load. Consequently, performance deterioration (i.e., slow-down of the operating speed) is caused and working efficiency is reduced.

The technique disclosed in JP-A-62-160331 is intended to suppress the performance deterioration to be as small as possible by presetting the relationship between the revolution speed of the prime mover and the displacement of the hydraulic pump in plural sets, and selecting one of the plural sets depending on the working state such that the engine revolution speed and the displacement of the hydraulic pump are controlled so as to make the maximum delivery rate of the hydraulic pump adapted for the working state.

In a system including pump absorption torque control means for horsepower control, however, the range where the hydraulic pump is able to deliver the hydraulic fluid at a maximum flow rate is given only as a limited range of the pump delivery pressure at a low level outside the range corresponding to a pump absorption torque control region. Thus, with the system disclosed in JP,A 62-160331, the maximum delivery rate is ensured in the limited range of the pump delivery pressure at a low level, but the delivery rate of the hydraulic pump is reduced and the performance deterioration is caused in the pump absorption torque control region as in the known general economy mode.

Usually, various load states are continuously mixed in a series of operations carried out by the hydraulic construction machine, and the frequency of pump load is maximized in an intermediate range of the pump delivery pressure, which is a part of the pump absorption torque control region. The system disclosed in JP,A 62-160331 is just able to ensure the maximum delivery rate in the limited range of the pump delivery pressure at a low level as described above, and that system is not effective in the region where the frequency of pump load is high (i.e., the intermediate range of the pump delivery pressure).

Further, when the various detection means are provided to automatically select a mode suitable for the current working state, the mode change may be performed as opposed to the intention of an operator to cause discontinuous variations in the engine revolution and the pump delivery rate, thus making the operator feel unnatural. In addition, the necessity of providing many detection means is disadvantageous in point of cost efficiency.

An object of the present invention is to provide a control system for a hydraulic construction machine, which can reduce the revolution speed of a prime mover and improve fuel economy with mode selection through mode selection means, which can suppress performance deterioration (slow-down of operating speed) due to a decrease of a pump delivery rate in a required load region, thereby increasing working efficiency, and which can ensure superior operability without causing discontinuous variations in the revolution speed of the prime mover and the pump delivery rate.

Means for Solving the Problems

To achieve the above object, the present invention is constituted as follows.

(1) A control system for a hydraulic construction machine, according to the present invention, comprises a prime mover; at least one variable displacement hydraulic pump driven by the prime mover; at least one hydraulic actuator driven by a hydraulic fluid from the hydraulic pump; and revolution speed control means for controlling a revolution speed of the prime mover, wherein the control system further comprises mode selection means for selecting a control mode related to the prime mover; load pressure detection means for detecting load pressure of the hydraulic pump; and target revolution speed setting means which stores a prime mover revolution speed preset therein to reduce the revolution speed of the prime mover with a rise of the load pressure of the hydraulic pump, and which, when a particular mode is selected by the mode selection means, determines a corresponding prime mover revolution speed by referring to the preset prime mover revolution speed based on the load pressure of the hydraulic pump detected by the load pressure detection means and sets a target revolution speed for the revolution speed control means based on the determined prime mover revolution speed.

In the present invention thus constituted, when the particular mode is selected by the mode selection means, the target revolution speed setting means determines the corresponding prime mover revolution speed by referring to the preset prime mover revolution speed based on the load pressure of the hydraulic pump and sets the target revolution speed for the revolution speed control means based on the determined prime mover revolution speed. Therefore, when the particular mode is selected, the revolution speed of the prime mover is controlled to slow down and fuel economy can be reduced. Also, the prime mover revolution speed used as a control base is set so as to reduce the revolution speed of the prime mover with a rise of the load pressure of the hydraulic pump. By properly adjusting the setting, therefore, performance deterioration (slow-down of operating speed) due to a decrease of a pump delivery rate can be suppressed in a required load region and working efficiency can be increased.

Further, by properly adjusting the above-mentioned setting, the revolution speed of the prime mover and the pump delivery rate can be continuously changed with respect to changes of load frequency during work. Hence the revolution speed of the prime mover and the pump delivery rate can be prevented from varying in a discontinuous way. As a result, it is possible to avoid an operator from feeling unnatural during the operation with abrupt changes of the operating speed and variations of engine sounds, and to increase operability.

(2) In above (1), preferably, the target revolution speed setting means sets, as the target revolution speed, a rated target revolution speed of the prime mover when the load pressure detected by the load pressure detection means is not higher than a first value, and reduces the target revolution speed with a rise of the load pressure when the load pressure detected by the load pressure detection means exceeds the first value.

By controlling the prime mover in such a manner, the revolution speed of the prime mover is controlled to slow down in a high load range, thus resulting in an improvement of fuel economy. In a low load range, work can be performed at the same pump delivery rate (operating speed) as that in a standard mode. Further, in a medium load range where load frequency is high, the revolution speed control can be performed in a manner capable of ensuring the satisfactory fuel economy and working speed at the same time.

(3) In above (1), preferably, the target revolution speed setting means sets, as the target revolution speed, a rated target revolution speed of the prime mover when the load pressure detected by the load pressure detection means is not higher than a first value, reduces the target revolution speed with a rise of the load pressure when the load pressure detected by the load pressure detection means exceeds the first value, and increases the target revolution speed to the rated target revolution speed with a further rise of the load pressure when the load pressure detected by the load pressure detection means exceeds a second value higher than the first value.

With such control, the operating speed at a low load and the operating speed (power strength) at a high load can be kept unchanged from those in the standard mode, while fuel economy can be improved at a medium load.

(4) In above (1), preferably, the control system further comprises pump absorption torque control means for reducing a maximum displacement of the hydraulic pump with a rise of the load pressure of the hydraulic pump such that maximum absorption torque of the hydraulic pump does not exceed a setting value, and the target revolution speed setting means sets, as the target revolution speed, a revolution speed lower than the rated target revolution speed of the prime mover in a maximum absorption torque control region of the pump absorption torque control means.

(5) In above (1), preferably, the target revolution speed setting means sets therein a revolution speed modification value as the preset prime mover revolution speed, determines a corresponding revolution speed modification value by referring to the preset revolution speed modification value based on the load pressure detected by the load pressure detection means, and obtains the target revolution speed based on the determined revolution speed modification value.

(6) In above (1), preferably, the target revolution speed setting means comprises first means for computing the revolution speed modification value when the load pressure detected by the load pressure detection means exceeds the first value; and second means for subtracting the revolution speed modification value from the rated target revolution speed of the prime mover, thereby computing the target revolution speed.

(7) In above (6), preferably, the target revolution speed setting means further comprises third means for invalidating the subtraction executed by the second means when a mode other than the particular mode is selected by the mode selection means, and for validating the subtraction executed by the second means when the particular mode is selected.

(8) In above (6), preferably, the control system further comprises pump absorption torque control means for reducing a maximum displacement of the hydraulic pump with a rise of the load pressure of the hydraulic pump when the load pressure of the hydraulic pump becomes higher than a third value, such that maximum absorption torque of the hydraulic pump does not exceed a setting value, and the first value is set close to the third value.

Advantages of the Invention

According to the present invention, fuel economy can be improved by reducing the revolution speed of the prime mover with mode selection through the mode selection means. In a required load region, performance deterioration (slow-down of the operating speed) due to a decrease of the pump delivery rate can be suppressed and working efficiency can be increased.

Also, since the revolution speed of the prime mover and the pump delivery rate are continuously changed even with changes of load frequency during work, it is possible to avoid an operator from feeling unnatural during the operation with abrupt changes of the operating speed and variations of engine sounds, and to increase operability.

Further, according to the present invention, in a high load range, the revolution speed of the prime mover is controlled to slow down and fuel economy is improved. In a low load range, work can be performed at the same pump delivery rate (operating speed) as that in the standard mode. In a medium load range where load frequency is high, the revolution speed control can be performed in a manner capable of ensuring the satisfactory fuel economy and working speed at the same time.

In addition, according to the present invention, the operating speed at a low load and the operating speed (power strength) at a high load can be kept unchanged, while fuel economy can be improved at a medium load.

Thus, by appropriately adjusting the setting of the target revolution speed of the prime mover with respect to the load pressure, it is possible to provide an optimum operating speed in a wide range of load conditions and to realize an improvement of fuel economy.

REFERENCE NUMERALS

Figure 1:
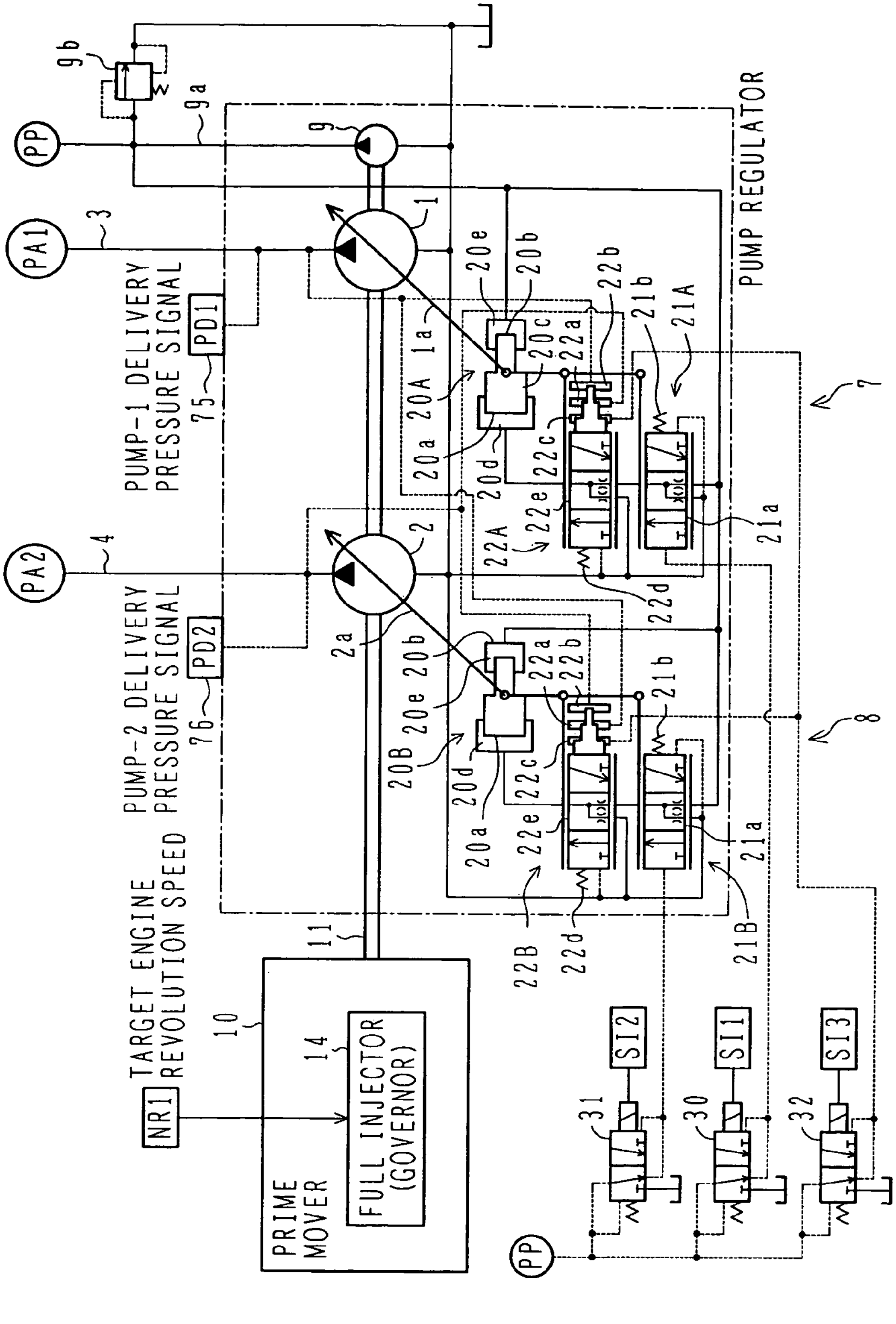
FIG. 1 is a diagram showing a control system for a prime mover and hydraulic pumps according to one embodiment of the present invention.

1, 2 hydraulic pumps
1*a*, 2*a* swash plates
5 valve unit
7, 8 regulators
10 prime mover
14 fuel injector
20A, 20B tilting actuators
21A, 21B first servo valves
22A, 22B second servo valves
30-32 solenoid control valves
38-44 operation pilot devices
50-56 actuators
70 controller
70*a*, 70*b* pump target tilting computing sections
70*g*, 70*h* output pressure computing sections
70*k*, 70*m* solenoid output current computing sections
70*i* pump maximum absorption torque computing section
70*n* output pressure computing section
70*p* solenoid output current computing section
700*a* reference target-revolution-speed computing section
700*b* power-mode rated target revolution setting section
700*c* pump-delivery-pressure mean value computing section
700*d* engine-revolution-speed modification value computing section
700*e* mode selector
700*f* subtracter
700*g* minimum value selector
71 engine control dial
72 mode selection switch
73, 74 pressure sensors
75, 76 pressure sensors

BEST MODE FOR CARRYING OUT THE INVENTION

Embodiments of the present invention will be described below with reference to the drawings. In the following embodiments, the present invention is applied to a control system for a prime mover and hydraulic pumps of a hydraulic excavator.

Figure 2:
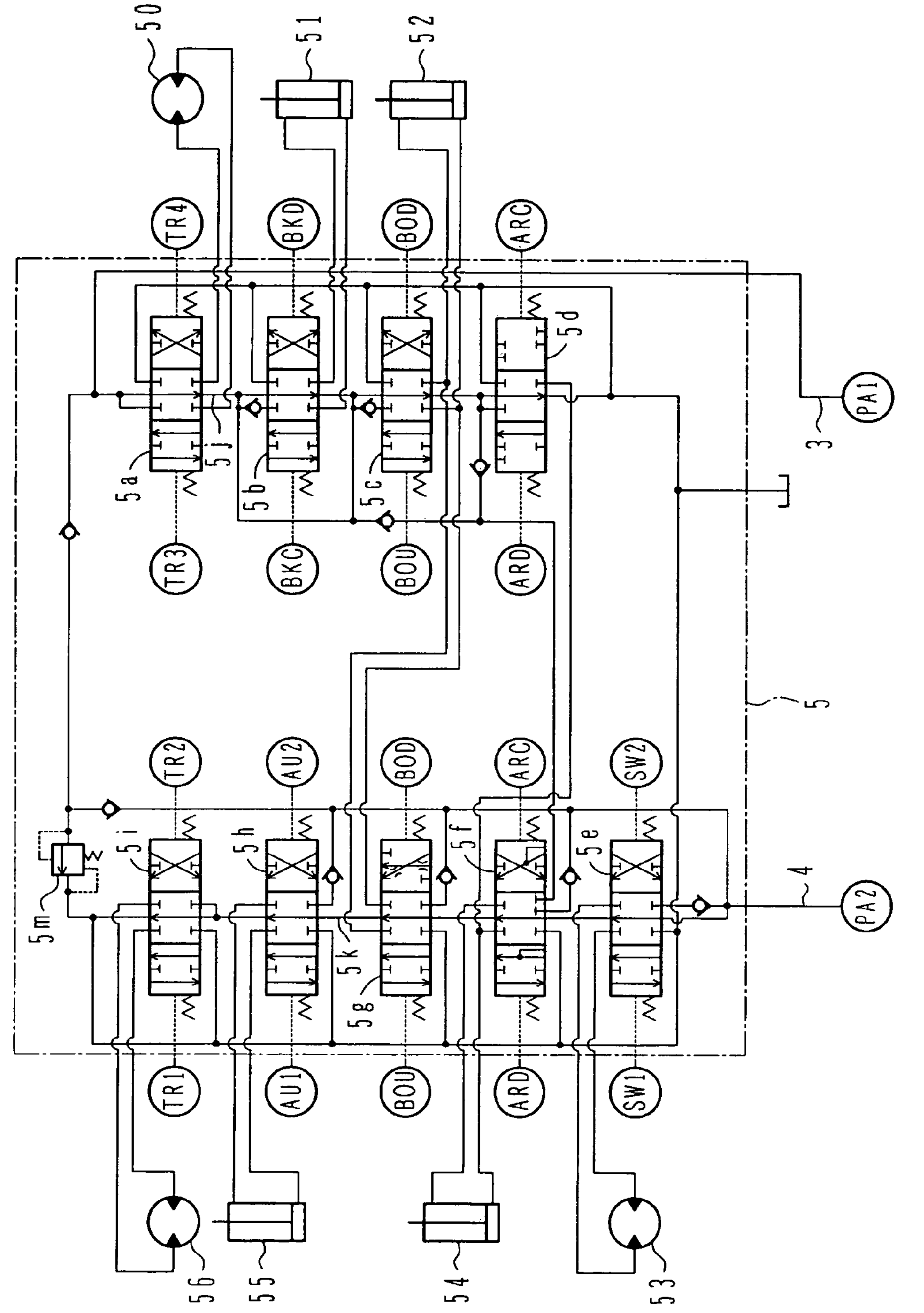
FIG. 2 is a hydraulic circuit diagram of valve units and actuators which are connected to the hydraulic pumps shown in FIG. 1.

Referring to FIG. 1, reference numerals 1 and 2 denote variable displacement hydraulic pumps of swash plate type, for example. A valve unit 5, shown in FIG. 2, is connected to delivery lines 3, 4 of the hydraulic pumps 1, 2. The hydraulic pumps 1, 2 deliver hydraulic fluids to a plurality of actuators 50-56 through the valve unit 5.

Reference numeral 9 denotes a fixed displacement pilot pump. A pilot relief valve 9*b* for holding the delivery pressure of the pilot pump 9 at a constant pressure is connected to a delivery line 9*a* of the pilot pump 9.

The hydraulic pumps 1, 2 and the pilot pump 9 are connected to an output shaft 11 of a prime mover 10 and are rotated by the prime mover 10.

Details of the valve unit 5 will be described below.

Referring to FIG. 2, the valve unit 5 includes two valve groups, i.e., flow control valves 5*a*-5*d* and flow control valves 5*e*-5*i*. The flow control valves 5*a*-5*d* are positioned on a center bypass line 5*j* connected to the delivery line 3 of the hydraulic pump 1, and the flow control valves 5*e*-5*i* are positioned on a center bypass line 5*k* connected to the delivery line 4 of the hydraulic pump 2. A main relief valve 5*m* for deciding a maximum level of the delivery pressure of the hydraulic pumps 1, 2 is disposed in the delivery lines 3, 4.

The flow control valves 5*a*-5*d* and the flow control valves 5*e*-5*i* are each of the center bypass type, and the hydraulic fluids delivered from the hydraulic pumps 1, 2 are supplied through one or more of those flow control valves to corresponding one or more of the actuators 50-56. The actuator 50 is a hydraulic motor for a right track (i.e., a right track motor), the actuator 51 is a hydraulic cylinder for a bucket (i.e., a bucket cylinder), the actuator 52 is a hydraulic cylinder for a boom (i.e., a boom cylinder), the actuator 53 is a hydraulic motor for a swing (i.e., a swing motor), the actuator 54 is a hydraulic cylinder for an arm (i.e., an arm cylinder), the actuator 55 is a backup hydraulic cylinder, and the actuator 56 is a hydraulic motor for a left track (i.e., a left track motor). The flow control valve 5*a* is used for operating the right track, the flow control valve 5*b* is used for operating the bucket, the flow control valve 5*c* is used for operating a first boom, the flow control valve 5*d* is used for operating a second arm, the flow control valve 5*e* is used for operating the swing, the flow control valve 5*f* is used for operating a first arm, the flow control valve 5*g* is used for operating a second boom, the flow control valve 5*h* is for backup, and the flow control valve 5*i* is used for operating the left track. In other words, two flow control valves 5*g*, 5*c* are provided for the boom cylinder 52 and two flow control valves 5*d*, 5*f* are provided for the arm cylinder 54 such that the hydraulic fluids delivered from the hydraulic pumps 1, 2 can be supplied to the boom cylinder 52 and the arm cylinder 54 in a joined manner.

Figure 3:
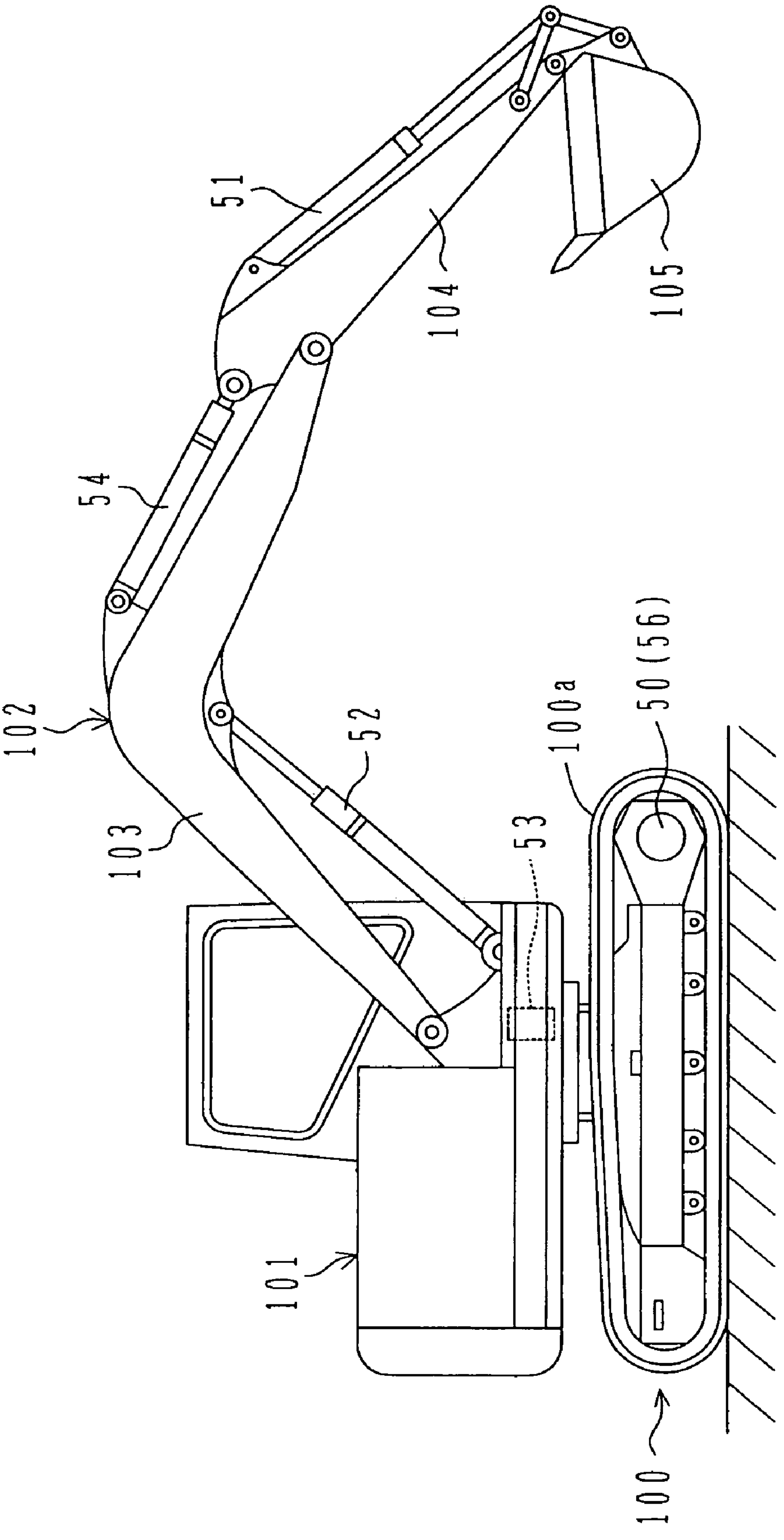
FIG. 3 is an external appearance view of a hydraulic excavator equipped with the control system for the prime mover and the hydraulic pumps according to the present invention.

FIG. 3 shows an external appearance of a hydraulic excavator equipped with the control system for the prime mover and the hydraulic pumps according to the present invention. The hydraulic excavator comprises a lower travel structure 100, an upper swing body 101, and a front operating mechanism 102. Left and right track motors 50, 56 are mounted to the lower travel structure 100, and crawlers 100*a* are rotated by the track motors 50, 56, thereby causing the hydraulic excavator to travel forward or rearward. A swing motor 53 is mounted to the upper swing body 101, and the upper swing body 101 is driven by the swing motor 53 to swing rightward or leftward relative to the lower travel structure 100. The front operating mechanism 102 is made up of a boom 103, an arm 104, and a bucket 105. The boom 103 is pivotally rotated by the boom cylinder 52 upward or downward. The arm 104 is operated by the arm cylinder 54 to pivotally rotate toward the dumping (unfolding) side or the crowding (scooping) side. The bucket 105 is operated by the bucket cylinder 51 to pivotally rotate toward the dumping (unfolding) side or the crowding (scooping) side.

Figure 4:
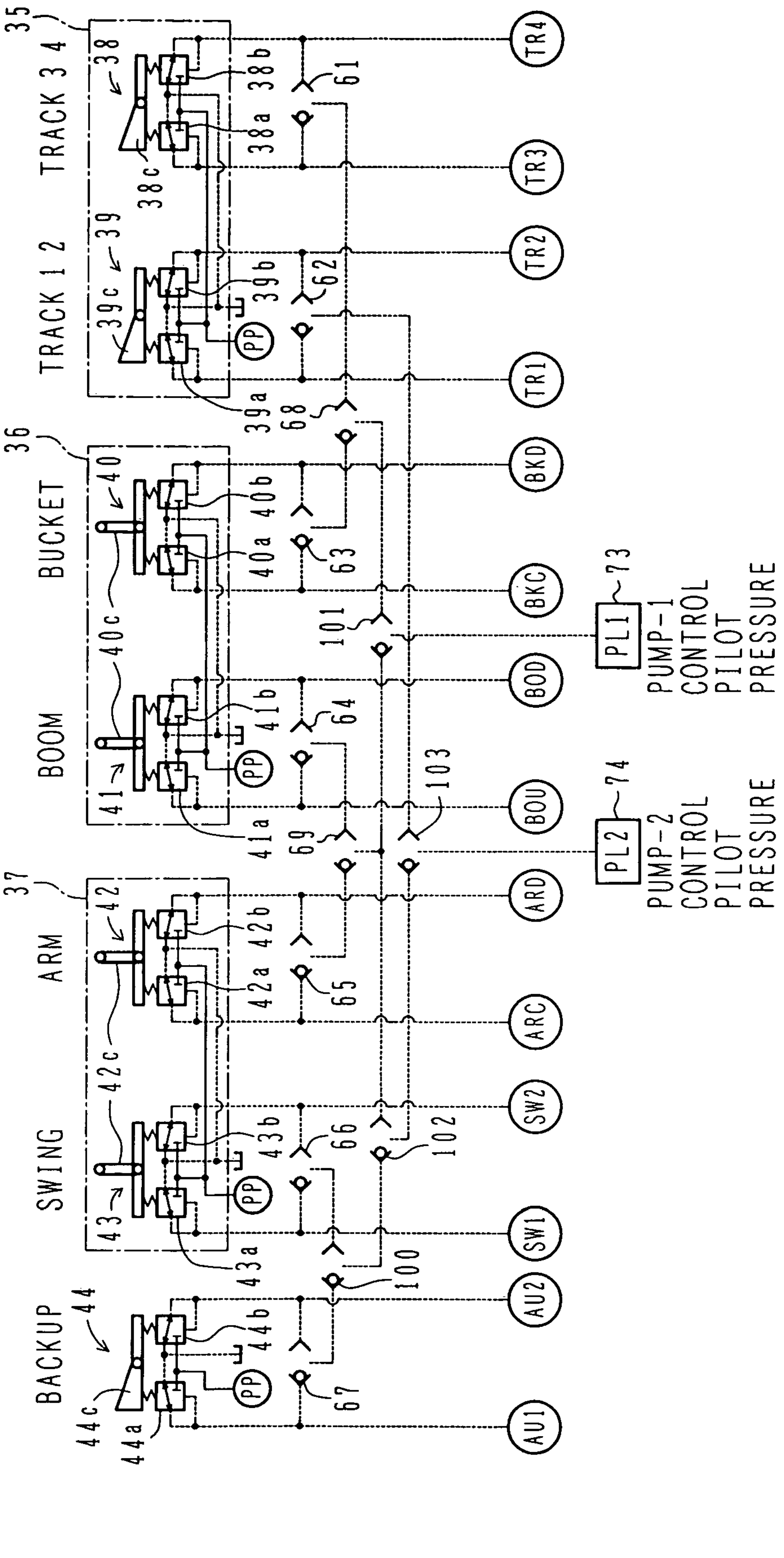
FIG. 4 is a diagram showing an operation pilot system for flow control valves shown in FIG. 2.

FIG. 4 shows an operation pilot system for the flow control valves 5*a*-5*i*.

The flow control valves 5*i*, 5*a* are shifted respectively by operation pilot pressures TR1, TR2 and TR3, TR4 supplied from operation pilot devices 39, 38 of an operating unit 35. The flow control valve 5*b* and the flow control valves 5*c*, 5*g* are shifted respectively by operation pilot pressures BKC, BKD and BOD, BOU supplied from operation pilot devices 40, 41 of an operating unit 36. The flow control valves 5*d*, 5*f* and the flow control valve 5*e* are shifted respectively by operation pilot pressures ARC, ARD and SW1, SW2 supplied from operation pilot devices 42, 43 of an operating unit 37. The flow control valve 5*h* is shifted by operation pilot pressures AU1, AU2 supplied from an operation pilot device 44.

The operation pilot devices 38-44 include respectively pilot valves (pressure reducing valves) 38*a*, 38*b*-44*a*, 44*b* in pair for each device. The operation pilot devices 38, 39 and 44 further include respectively control pedals 38*c*, 39*c* and 44*c*. The operation pilot devices 40, 41 further include a common control lever 40*c*, and the operation pilot devices 42, 43 further include a common control lever 42*c*. When any of the control pedals 38*c*, 39*c* and 44*c* and the control levers 40*c*, 42*c* is manipulated, the pilot valve of the associated operation pilot device is operated depending on the direction in which the pedal or lever is manipulated, and an operation pilot pressure is produced depending on an operation input from the pedal or lever.

Shuttle valves 61-67 are connected to output lines of the respective pilot valves of the operation pilot devices 38-44, and other shuttle valves 68, 69 and 100-103 are further connected to the shuttle valves 61-67 in a hierarchical arrangement. More specifically, maximum one of the operation pilot pressures supplied from the operation pilot devices 38, 40, 41 and 42 is extracted as a control pilot pressure PL1 for the hydraulic pump 1 by the shuttle valves 61, 63, 64, 65, 68, 69 and 101, and maximum one of the operation pilot pressures supplied from the operation pilot devices 39, 41, 42, 43 and 44 is extracted as a control pilot pressure PL2 for the hydraulic pump 2 by the shuttle valves 62, 64, 65, 66, 67, 69, 100, 102 and 103.

The control system for the prime mover and the hydraulic pumps according to the present invention are provided in association with the hydraulic drive system constructed as described above. Details of the control system will be described below.

In FIG. 1, regulators 7, 8 are provided in association with the hydraulic pumps 1, 2, respectively. The regulators 7, 8 control tilting positions of swash plates 1*a*, 2*a* which serve as displacement varying mechanisms for the hydraulic pumps 1, 2, thereby controlling respective pump delivery rates.

The regulators 7, 8 of the hydraulic pumps 1, 2 comprise respectively tilting actuators 20A, 20B (hereinafter represented by 20 as required), first servo valves 21A, 21B (hereinafter represented by 21 as required) for performing positive tilting control in accordance with the operation pilot pressures supplied from the operation pilot devices 38-44 shown in FIG. 4, and second servo valves 22A, 22B (hereinafter represented by 22 as required) for performing total horsepower control of the hydraulic pumps 1, 2. Those servo valves 21, 22 control the pressure of a hydraulic fluid supplied from the pilot pump 9 and acting on the tilting actuator 20, whereby the tilting positions of the hydraulic pumps 1, 2 are controlled.

Details of the tilting actuator 20 and the first and second servo valves 21, 22 will be described below.

Each tilting actuator 20 comprises a working piston 20*c* having a large-diameter pressure bearing portion 20*a* and a small-diameter pressure bearing portion 20*b* at opposite ends, and pressure bearing chambers 20*d*, 20*e* in which the pressure bearing portions 20*a*, 20*b* are positioned. When the pressures in the pressure bearing chambers 20*d*, 20*e* are equal to each other, the working piston 20*c* is moved to the right as viewed in FIG. 1, whereby the tilting of the swash plate 1*a* or 2*a* is increased and the pump delivery rate is increased correspondingly. When the pressure in the pressure bearing chamber 20*d* in the large-diameter side lowers, the working piston 20*c* is moved to the left as viewed in FIG. 1, whereby the tilting of the swash plate 1*a* or 2*a* is reduced and the pump delivery rate is reduced correspondingly. Further, the pressure bearing chamber 20*d* in the large-diameter side is connected to a delivery line 9*a* of the pilot pump 9 through the first and second servo valves 21, 22, and the pressure bearing chamber 20*e* in the small-diameter side is directly connected to the delivery line 9*a* of the pilot pump 9.

Each first servo valve 21 for the positive tilting control is a valve which is operated by control pressure from a solenoid control valve 30 or 31 and which controls the tilting position of each hydraulic pump 1, 2. When the control pressure is high, a valve member 21*a* is moved to the right, as viewed in FIG. 1, such that the pilot pressure from the pilot pump 9 is transmitted to the pressure bearing chamber 20*d* without being reduced, to thereby increase the tilting of the hydraulic pump 1, 2. As the control pressure lowers, the valve member 21*a* is moved to the left, as viewed in FIG. 1, by a force of a spring 21*b* such that the pilot pressure from the pilot pump 9 is transmitted to the pressure bearing chamber 20*d* after being reduced, to thereby decrease the tilting of the hydraulic pump 1, 2.

Each second servo valve 22 for the total horsepower control is a valve which is operated by the delivery pressures of the hydraulic pumps 1, 2 and control pressure from a solenoid control valve 32 and which controls absorption torque of the hydraulic pumps 1, 2, thereby performing the total horsepower control.

More specifically, the delivery pressures of the hydraulic pumps 1, 2 and the control pressure from the solenoid control valve 32 are introduced respectively to pressure bearing chambers 22*a*, 22*b* and 22*c* of an operation drive sector. When the sum of hydraulic forces of the delivery pressures of the hydraulic pumps 1, 2 is smaller than a value of the difference between a resilient force of a spring 22*d* and a hydraulic force of the control pressure introduced to the pressure bearing chamber 22*c*, a valve member 22*e* is moved to the right, as viewed in FIG. 1, such that the pilot pressure from the pilot pump 9 is transmitted to the pressure bearing chamber 20*d* without being reduced, to thereby increase the tilting of each hydraulic pump 1, 2. As the sum of hydraulic forces of the delivery pressures of the hydraulic pumps 1, 2 is increased in excess of the above-mentioned difference value, the valve member 22*a* is moved to the left, as viewed in FIG. 1, such that the pilot pressure from the pilot pump 9 is transmitted to the pressure bearing chamber 20*d* after being reduced, to thereby reduce the tilting of each hydraulic pump 1, 2. As a result, the tilting (displacement) of each hydraulic pump 1, 2 is reduced with a rise of the delivery pressures of the hydraulic pumps 1, 2, and the maximum absorption torque of the hydraulic pumps 1, 2 is controlled so as to not exceed a setting value. At that time, the setting value of the maximum absorption torque is decided by the value of the difference between the resilient force of the spring 22*d* and the hydraulic force of the control pressure introduced to the pressure bearing chamber 22*c*, and the setting value is variable depending on the control pressure from the solenoid control valve 32. When the control pressure from the solenoid control valve 32 is low, the setting value is large, and as the control pressure from the solenoid control valve 32 rises, the setting value is reduced.

Figure 5:
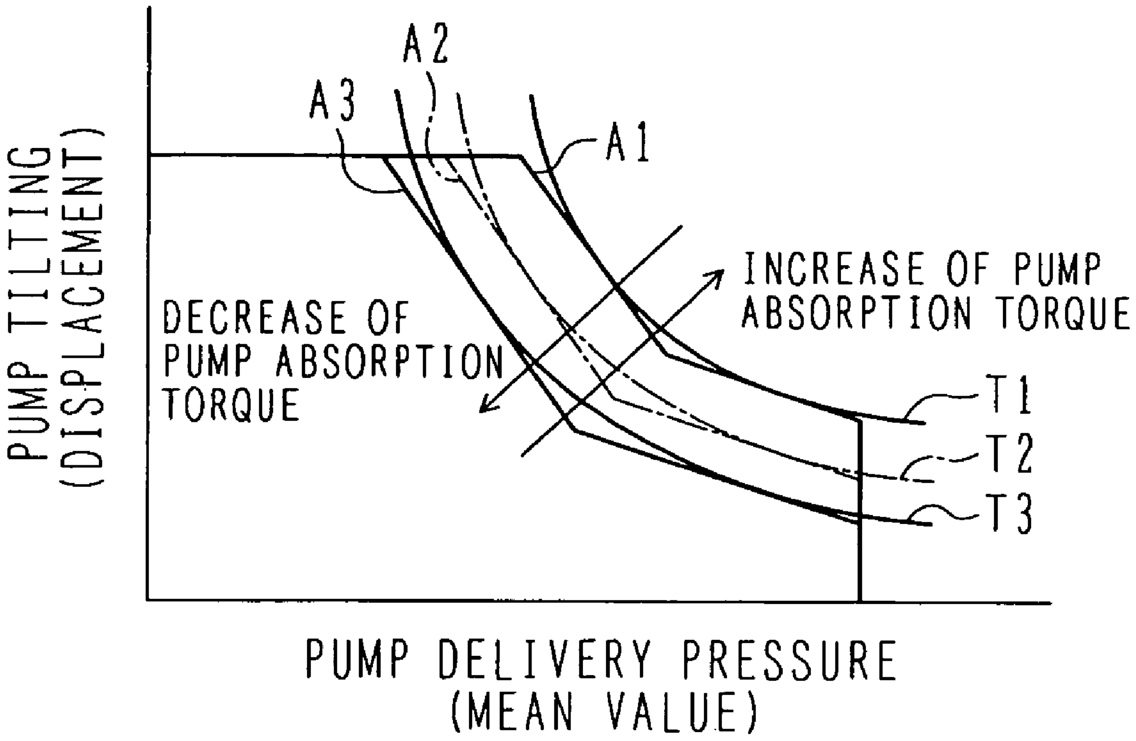
FIG. 5 is a graph showing characteristics of absorption torque control by a second servo valve of a pump regulator shown in FIG. 1.

FIG. 5 shows absorption torque control characteristics of each hydraulic pump 1, 2 provided with the second servo valve 22 for the total horsepower control. In FIG. 5, the horizontal axis represents a mean value of the delivery pressures of the hydraulic pumps 1, 2 and the vertical axis represents the tilting (displacement) of each hydraulic pump 1, 2. A1, A2 and A3 each represent a setting value of the maximum absorption torque that is decided depending on the difference between the force of the spring 22*d* and the hydraulic force in the pressure bearing chamber 22*c*. As the control pressure from the solenoid control valve 32 rises (i.e., as a drive current reduces), the setting value of the maximum absorption torque decided depending on the difference between the force of the spring 22*d* and the hydraulic force in the pressure bearing chamber 22*c* is changed in sequence of A1, A2 and A3, and the maximum absorption torque of each hydraulic pump 1, 2 is reduced in sequence of T1, T2 and T3. Also, as the control pressure from the solenoid control valve 32 lowers (i.e., as the drive current increases), the setting value of the maximum absorption torque decided depending on the difference between the force of the spring 22*d* and the hydraulic force in the pressure bearing chamber 22*c* is changed in sequence of A3, A2 and A1, and the maximum absorption torque of each hydraulic pump 1, 2 is increased in sequence of T3, T2 and T1.

Returning again to FIG. 1, the solenoid control valves 30, 31 and 32 are proportional pressure reducing valves operated by drive currents SI1, SI2 and SI3, respectively. The solenoid control valves 30, 31 and 32 operate such that when the drive currents SI1, SI2 and SI3 are at a minimum, they output maximum control pressures, and as the drive currents SI1, SI2 and SI3 are increased, they output lower control pressures. The drive currents SI1, SI2 and SI3 are outputted from a controller 70 shown in FIG. 6.

The prime mover 10 is a diesel engine and includes a fuel injector 14. The fuel injector 14 has a governor mechanism and controls the engine revolution speed to be held at a target engine revolution speed NR1 which is given as an output signal from the controller 70 shown in FIG. 6.

As types of the governor mechanism in the fuel injector, there are an electronic governor control unit for controlling the engine revolution speed to be held at the target engine revolution speed by using an electrical signal from the controller, and a mechanical governor controller in which a motor is coupled to a governor lever of a mechanical fuel injection pump and the position of the governor lever is controlled by driving the motor in accordance with a command value from the controller to a preset position where the target engine revolution speed is obtained. Any type of governor control unit can be effectively used as the fuel injector 14 in this embodiment.

Figure 6:
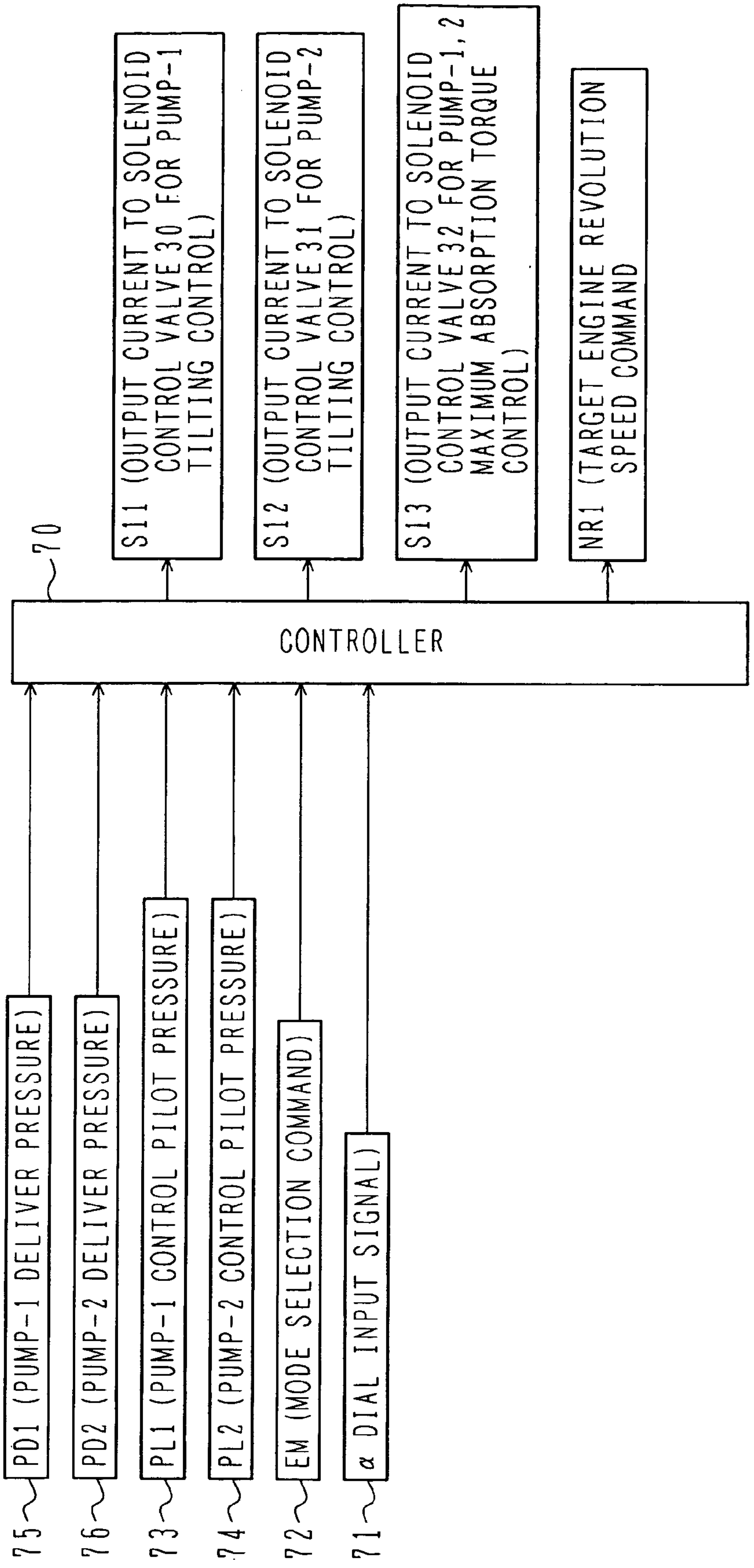
FIG. 6 is a block diagram showing input/output relationships of a controller.

The prime mover 10 includes an engine control dial 71, shown in FIG. 6, as a target engine revolution speed input section through which an operator manually inputs the target engine revolution speed. A signal representing an input angle α from the engine control dial is taken into the controller 70.

Also, in relation to the revolution speed control of the prime mover 10, a mode selection switch 72 is disposed, as shown in FIG. 6, to select one of a standard mode and an economy mode. A signal representing a mode selection command EM is taken from the mode selection switch 72 into the controller 70. The standard mode is a mode in which the target revolution speed is changeable by the engine control dial 71 and a maximum rated engine revolution speed is set; namely, it is used as a power mode. The economy mode is a mode in which the engine revolution speed is reduced by a certain amount regardless of the operating situation of an excavator body.

Further, there are disposed, as shown in FIG. 1, pressure sensors 75, 76 for detecting respective delivery pressures PD1, PD2 of the hydraulic pumps 1, 2 and, as shown in FIG. 4, pressure sensors 73, 74 for detecting the respective control pilot pressures PL1, PL2 for the hydraulic pumps 1, 2.

FIG. 6 shows input/output relationships of all signals for the controller 70. The controller 70 receives various input signals, i.e., the signal of the input angle α from the engine control dial 71, a signal of the mode selection command EM from the mode selection switch 72, signals of the pump control pilot pressures PL1, PL2 from the pressure sensors 73, 74, and signals of the delivery pressures PD1, PD2 of the hydraulic pumps 1, 2 from the pressure sensors 75, 76. After executing predetermined arithmetic and logical processing, the controller 70 outputs the drive currents SI1, SI2 and SI3 to the solenoid control valves 30, 31 and 32, thereby controlling the tilting position, i.e., the delivery rate, of each hydraulic pump 1, 2, and also outputs a signal of the target engine revolution speed NR1 to the fuel injector 14, thereby controlling the engine revolution speed.

Figure 7:
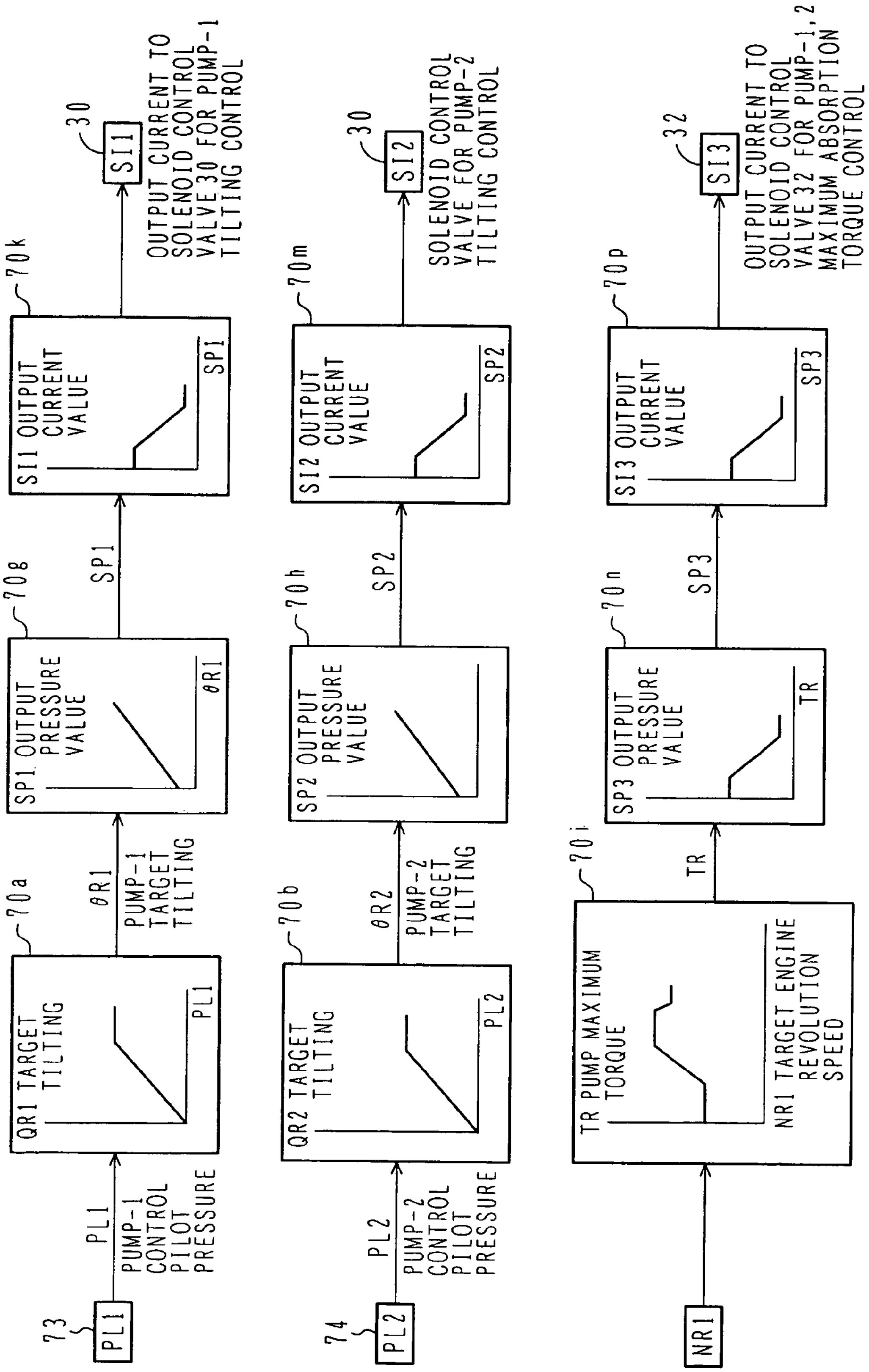
FIG. 7 is a functional block diagram showing processing functions of a pump control section in the controller.

FIG. 7 shows processing functions of the controller 70 relating to the control of the hydraulic pumps 1, 2.

Referring to FIG. 7, the controller 70 has the functions executed by pump target tilting computing sections 70*a*, 70*b*, output pressure computing sections 70*g*, 70*h* for the solenoid control valves 30, 31, solenoid output current computing sections 70*k*, 70*m*, a pump maximum absorption torque computing section 70*i*, an output pressure computing section 70*n* for the solenoid control valve 32, and a solenoid output current computing section 70*p*.

The pump target tilting computing section 70*a* receives the signal of the control pilot pressure PL1 for the hydraulic pump 1 and computes a target tilting θR1 of the hydraulic pump 1 depending on the control pilot pressure PL1 at that time by referring to a table stored in a memory with the received signal being a parameter. The target tilting θR1 is provided as reference flow metering of positive tilting control for respective control inputs from the pilot operation devices 38, 40, 41 and 42. In a memory table, the relationship between PL1 and θR1 is set such that as the control pilot pressure PL1 rises, the target tilting θR1 increases.

The output pressure computing section 70*g* computes an output pressure (control pressure) SP1 for the solenoid control valve 30 at which the target tilting θR1 is obtained in the hydraulic pump 1. The solenoid output current computing section 70*k* computes the drive current SI1 for the solenoid control valve 30 at which the output pressure (control pressure) SP1 is obtained, and then outputs the drive current SI1 to the solenoid control valve 30.

Similarly, in the pump target tilting computing section 70*b*, the output pressure computing section 70*h*, and the solenoid output current computing section 70*m*, the drive current SI2 for the tilting control of the hydraulic pump 2 is computed based on the pump control signal PL2 and is then outputted to the solenoid control valve 31.

The pump maximum absorption torque computing section 70*i* receives the signal of the target engine revolution speed NR1 and computes maximum absorption torque TR of each hydraulic pump 1, 2 corresponding to the target engine revolution speed NR1 at that time by referring to a table stored in a memory with the received signal being a parameter. The maximum absorption torque TR means target maximum absorption torque of each hydraulic pump 1, 2 which is matched with an output torque characteristic of the engine 10 rotating at the target engine revolution speed NR1. In the table stored in the memory, the relationship between NR1 and TR is set as follows. When the target engine revolution speed NR1 is in a low revolution speed range near an idle engine revolution speed, the maximum absorption torque TR is set to a minimum. As the target engine revolution speed NR1 increases from the low revolution speed range, the maximum absorption torque TR is also increased, and when the target engine revolution speed NR1 is in a range slightly lower than a maximum rated revolution speed Nmax, the maximum absorption torque TR takes a maximum TRmax. Finally, when the target engine revolution speed NR1 reaches the maximum rated revolution speed Nmax, the maximum absorption torque TR is set to a value slightly smaller than the maximum TRmax.

The output pressure computing section 70*n* receives the maximum absorption torque TR and computes an output pressure (control pressure) SP3 for the solenoid control valve 32 at which the setting value of the maximum absorption torque decided depending on the difference between the force of the spring 22*d* and the hydraulic force in the pressure bearing chamber 22*c* of the second servo valve 22 becomes TR. The solenoid output current computing section 70*p* computes the drive current SI3 for the solenoid control valve 32 at which the output pressure (control pressure) SP3 is obtained, and then outputs the drive current SI3 to the solenoid control valve 32.

The solenoid control valve 32 having received the drive current SI3, as described above, outputs the control pressure SP3 corresponding to the drive current SI3, and maximum absorption torque having the same value as the maximum absorption torque TR obtained in the computing section 70*i* is set in the second servo valve 22.

Figure 8:
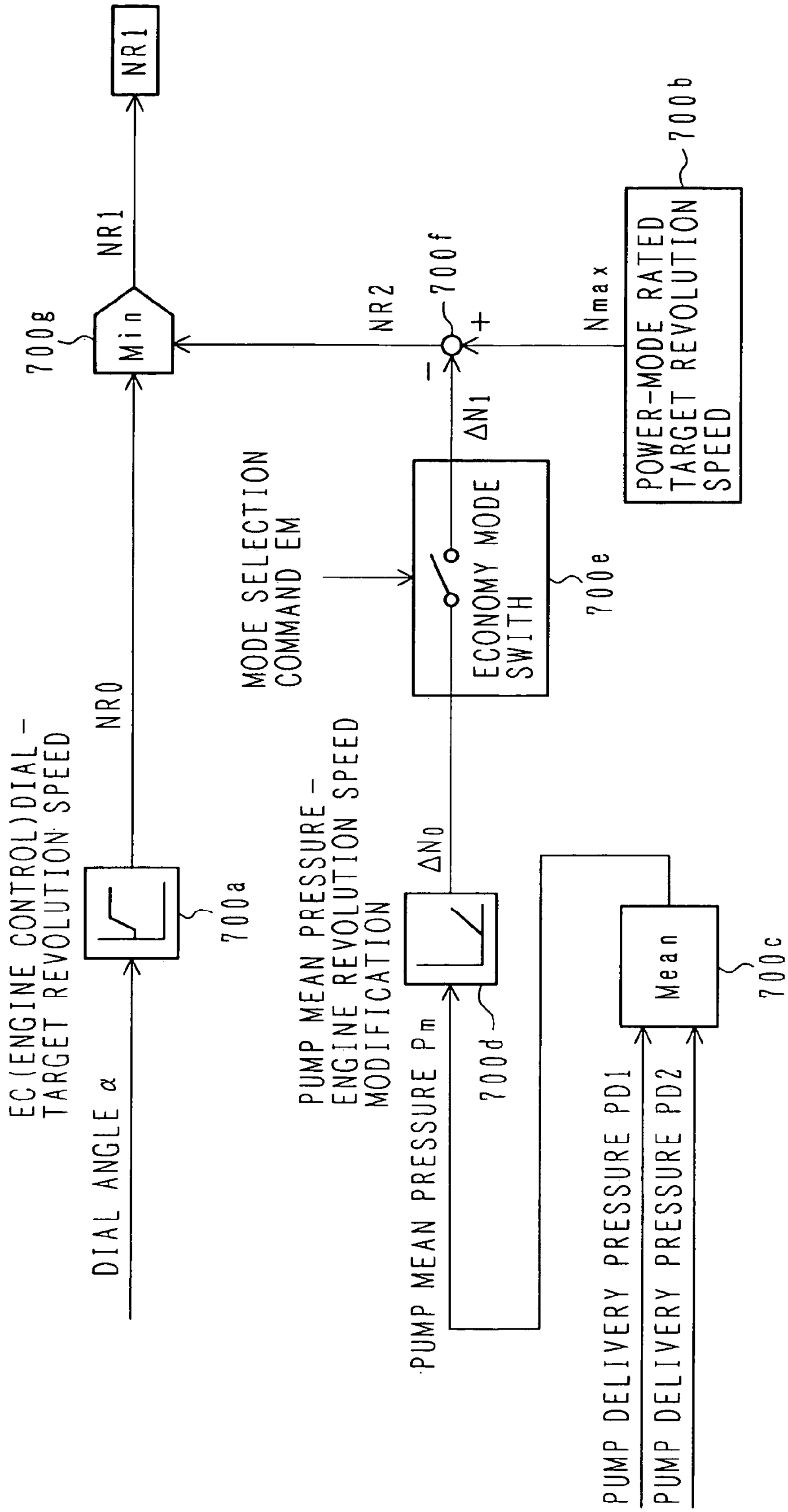
FIG. 8 is a functional block diagram showing processing functions of an engine control section in the controller.

FIG. 8 shows processing functions of the controller 70 relating to the control of the engine 10.

Referring to FIG. 8, the controller 70 has the functions executed by a reference target-revolution-speed computing section 700*a*, a power-mode rated target revolution speed setting section 700*b*, a pump-delivery-pressure mean value computing section 700*c*, an engine-revolution-speed modification value computing section 700*d*, a mode selector 700*e*, a subtracter 700*f*, and a minimum value selector 700*g*.

The reference target-revolution-speed computing section 700*a* receives the signal of the input angle α from the engine control dial 71 and computes a reference target revolution speed NR0 corresponding to α at that time by referring to a table stored in a memory with the received signal being a parameter. NR0 serves as a reference value of the target engine revolution speed NR1. The relationship between α and NR0 is set such that as the input angle α increases, the reference target revolution speed NR0 also increases.

The power-mode rated target revolution speed setting section 700*b* sets and outputs a maximum rated target revolution speed Nmax in the power mode.

The pump-delivery-pressure mean value computing section 700*c* receives the signals of the delivery pressures PD1, PD2 of the hydraulic pumps 1, 2 and computes a mean value of the delivery pressures PD1, PD2 as a pump delivery pressure mean value Pm. The delivery pressures PD1, PD2 of the hydraulic pumps 1, 2 and the average value Pm thereof are values increasing and decreasing depending on the magnitudes of loads of the hydraulic actuators 50-56. In this specification, those values are collectively called "load pressure of the hydraulic pump" as required.

The engine-revolution-speed modification value computing section 700*d* receives the pump delivery pressure mean value Pm and computes a engine revolution speed modification value ΔN0 corresponding to Pm at that time by referring to a table stored in a memory with the received mean value Pm being a parameter.

Figure 9:
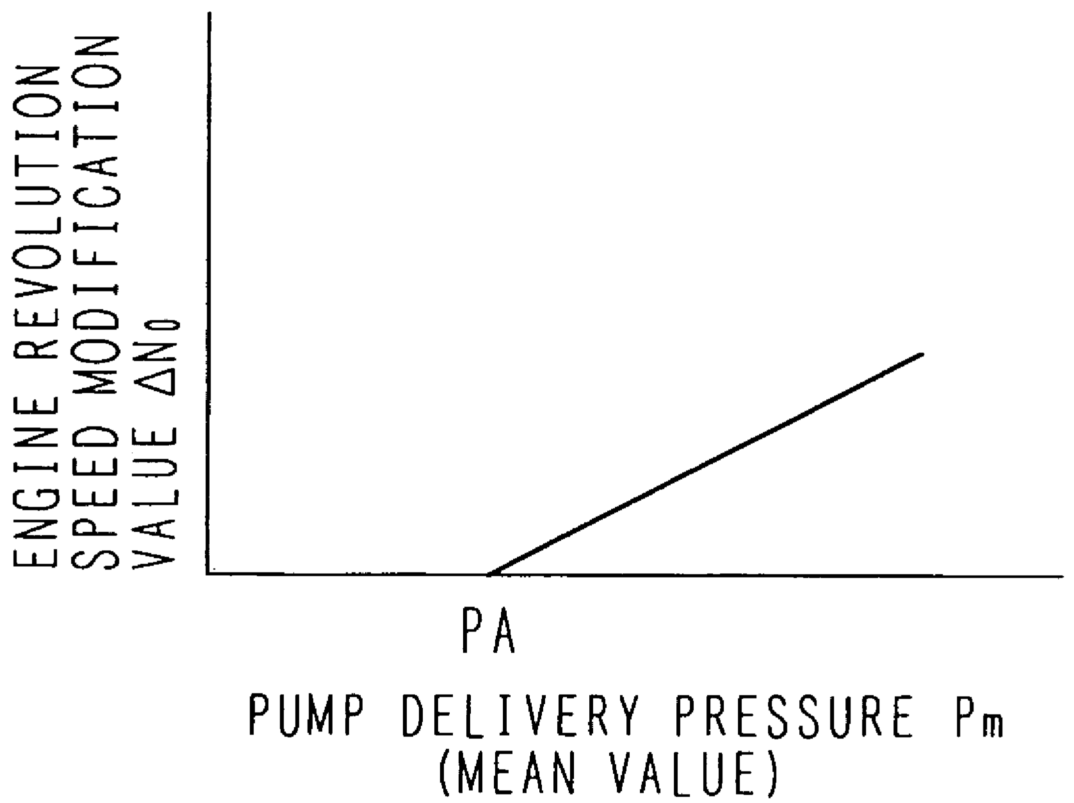
FIG. 9 is a graph showing, in enlarged scale, the relationship between a pump delivery pressure mean value Pm and an engine revolution speed modification value ΔN0, which is set in an engine-revolution-speed modification value computing section.

FIG. 9 shows, in enlarged scale, the relationship between the pump delivery pressure mean value Pm and the engine revolution speed modification value ΔN0, which is set in the engine-revolution-speed modification value computing section 700*d*. The relationship between Pm and ΔN0 is set in the table stored in the memory as follows. When the pump delivery pressure mean value Pm is not higher than a pressure PA near a midpoint, the engine revolution speed modification value ΔN0 is 0. When the pump delivery pressure mean value Pm exceeds the pressure PA, the engine revolution speed modification value ΔN0 is increased with an increase of the pump delivery pressure mean value Pm.

The range where the engine revolution speed modification value ΔN0 is 0 (i.e., the range where the pump delivery pressure mean value Pm is from 0 to the preset pressure PA) corresponds to a region Y (described later) where the load pressures of the hydraulic pumps 1, 2 are lower than those in a control region X (described later) of pump absorption torque control means. Also, the range where the engine revolution speed modification value ΔN0 is larger than 0 (i.e., the range where the pump delivery pressure mean value Pm is higher than PA) corresponds to the control region X (described later) of the second servo valve (pump absorption torque control means).

The mode selector 700*e* is turned off and outputs an engine revolution speed modification value ΔN1=0 when the mode selection command EM selects the standard mode. When the mode selection command EM selects the economy mode, the mode selector 700*e* is turned on and outputs, as the engine revolution speed modification value ΔN1, the engine revolution speed modification value ΔN0 computed by the engine-revolution-speed modification value computing section 700*d* (i.e., ΔN1=ΔN0).

The subtracter 700*f* subtracts the engine revolution speed modification value ΔN1 given as an output of the mode selector 700*e* from the rated target revolution speed Nmax given as an output of the rated target revolution speed setting section 700*b*, thereby computing a target engine revolution speed NR2.

The minimum value selector 700*g* selects smaller one of the reference target revolution speed NR0 computed by the reference target-revolution-speed computing section 700*a* and the target revolution speed NR2 computed by the subtracter 700*f*, and then outputs the selected one as the target engine revolution speed NR1. The target engine revolution speed NR1 is sent to the fuel injector 14 (see FIG. 1). Also, the target engine revolution speed NR1 is sent to the pump maximum absorption torque computing section 70*e* (see FIG. 7) that is included in the same controller 70 and is related to the control of the hydraulic pumps 1,2.

In the arrangement described above, the fuel injector 14 constitutes revolution speed control means for controlling the revolution speed of the prime mover 10. The mode selection switch 72 constitutes mode selection means for selecting the control mode for the prime mover 10. The pressure sensors 75, 76 constitute load pressure detection means for detecting the load pressures of the hydraulic pumps 1, 2. The functions executed by the reference target-revolution-speed computing section 700*a*, the power-mode rated target revolution speed setting section 700*b*, the pump-delivery-pressure mean value computing section 700*c*, the engine-revolution-speed modification value computing section 700*d*, the mode selector 700*e*, the subtracter 700*f*, and the minimum value selector 700*g* of the controller 70, shown in FIG. 8, constitute target revolution speed setting means which stores a prime mover revolution speed (engine revolution speed modification value) preset therein to reduce the revolution speed of the prime mover 10 with a rise of the load pressures of the hydraulic pumps 1, 2, and which, when a particular mode (economy mode) is selected by the mode selection means 72, determines a corresponding prime mover revolution speed by referring to the preset prime mover revolution speed based on the load pressures of the hydraulic pumps 1, 2 detected by the load pressure detection means and sets the target engine revolution speed NR1 for the revolution speed control means 14 based on the determined prime mover revolution speed.

Specifically, the target revolution speed setting means sets therein the revolution speed modification value ΔN0 as the preset prime mover revolution speed, determines a corresponding revolution speed modification value ΔN0 by referring to the preset revolution speed modification value ΔN0 based on the load pressures of the hydraulic pumps 1, 2 detected by the load pressure detection means 75, 76, and obtains the target revolution speed NR1 based on the determined revolution speed modification value.

Also, the target revolution speed setting means sets, as the target revolution speed NR1, the rated target revolution speed (Nmax) of the prime mover 10 when the load pressures detected by the load pressure detection means 75, 76 are lower than the preset value (PA), and it reduces the target revolution speed NR1 with a rise of the load pressures when the load pressures of the hydraulic pumps 1, 2 detected by the load pressure detection means 75, 76 exceed the preset value (PA).

Further, the second servo valve 22 constitutes pump absorption torque control means for controlling the displacements of the hydraulic pumps 1, 2 to be reduced with a rise of the load pressures of the hydraulic pumps 1, 2 such that the maximum absorption torque of the hydraulic pumps 1, 2 will not exceed a setting value. The target revolution speed setting means sets, as the target revolution speed NR1, a revolution speed lower than the rated target revolution speed Nmax of the prime mover 10 in the maximum absorption torque control region X of the pump absorption torque control means.

The features of operation of this embodiment having the above-described arrangement will be described below with reference to FIGS. 11-16.

First, a comparative example is described. It is here assumed that the comparative example differs from the above-described embodiment of the present invention only in the processing functions related to the engine control, shown in FIG. 8, among the system arrangement of the embodiment.

Figure 10:
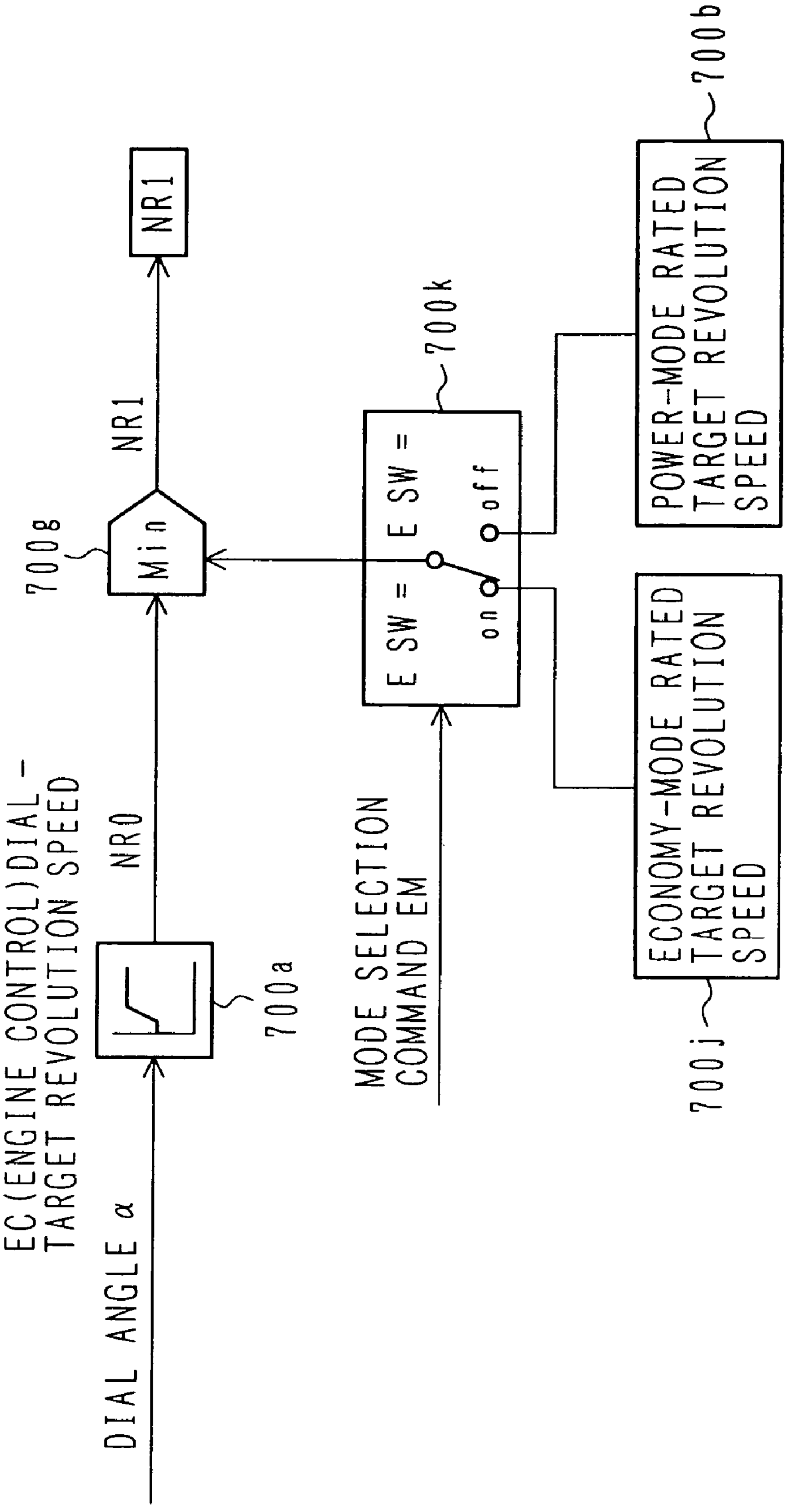
FIG. 10 is a functional block diagram, similar to FIG. 8, showing processing functions related to engine control in a system of a comparative example.

FIG. 10 is a functional block diagram, similar to FIG. 8, showing processing functions related to engine control in the system of the comparative example. The system of the comparative example has, as the processing functions related to the engine control, functions executed by a reference target-revolution-speed computing section 700*a*, a power-mode rated target revolution speed setting section 700*b*, an economy-mode rated target revolution speed setting section 700*j*, a mode selector 700*k*, and a minimum value selector 700*g*.

The reference target-revolution-speed computing section 700*a* and the power-mode rated target revolution speed setting section 700*b* are the same as those in this embodiment shown in FIG. 8.

The economy-mode rated target revolution speed setting section 700*j* sets and outputs a rated target revolution speed Neco in the economy mode.

The mode selector 700*k* outputs, as the target engine revolution speed NR2, a rated target revolution speed Nmax set by the power-mode rated target revolution speed setting section 700*b* when the mode selection command EM selects the standard mode. When the mode selection command EM selects the economy mode, the mode selector 700*k* outputs, as the target engine revolution speed NR2, the rated target revolution speed Neco set by the economy-mode rated target revolution speed setting section 700*j*.

The minimum value selector 700*g* selects smaller one of the reference target revolution speed NR0 computed by the reference target-revolution-speed computing section 700*a* and the target revolution speed NR2 selected by the mode selector 700*k*, and then outputs the selected one as the target engine revolution speed NR1. The target engine revolution speed NR1 is sent to the fuel injector 14 (see FIG. 1). Also, the target engine revolution speed NR1 is sent to the pump maximum absorption torque computing section 70*i*, shown in FIG. 7, which is related to the control of the hydraulic pumps 1, 2.

Figure 11:
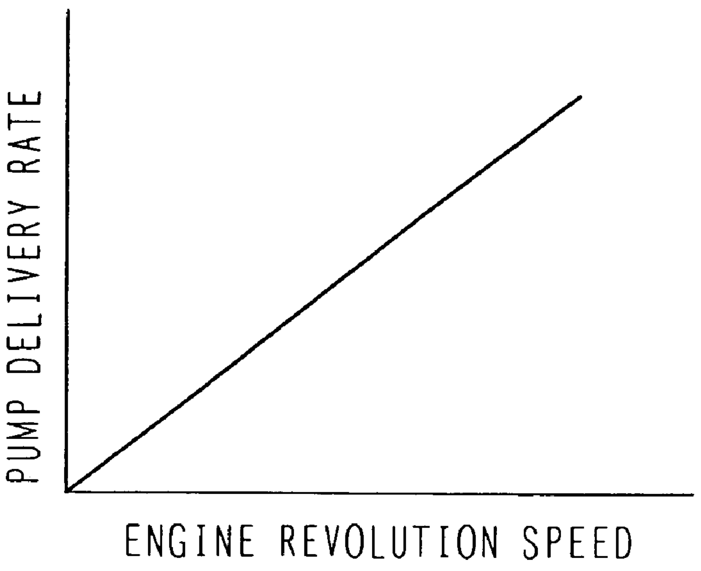
FIG. 11 is a graph showing the relationship between an engine revolution speed and a pump delivery rate.

FIG. 11 is a graph showing the relationship between the engine revolution speed (i.e., the revolution speed of the prime mover 10), and the pump delivery rate (i.e., the delivery rate of each hydraulic pump 1, 2). As seen from FIG. 11, as the revolution speed of the prime mover increases, the pump delivery rate also increases.

Figure 12:
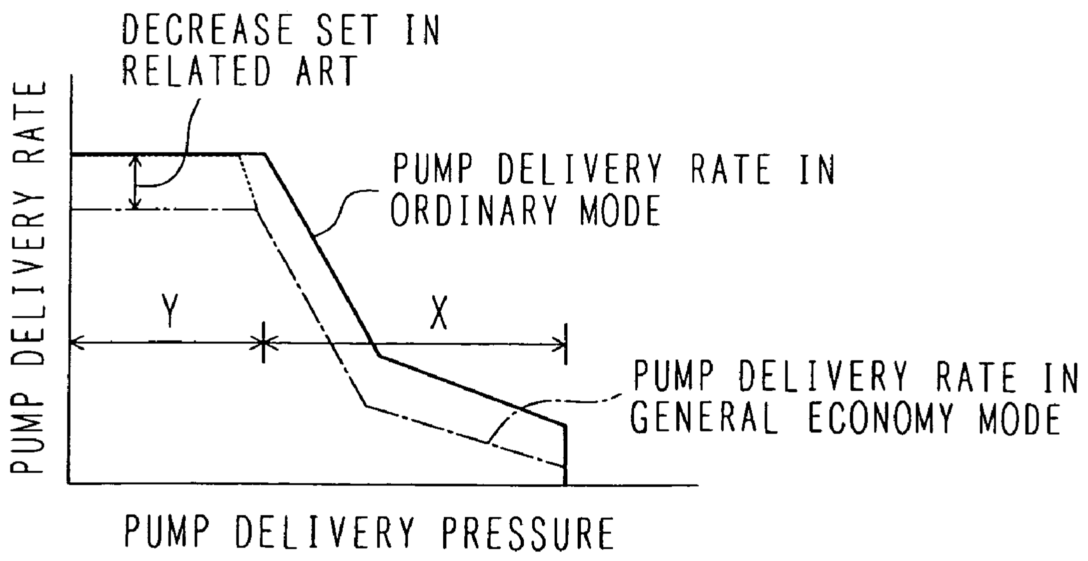
FIG. 12 is a graph showing changes of the pump delivery rate with respect to pump delivery pressure when a mode selection command EM is issued for switchover from a standard mode, i.e., a power mode, to an economy mode in the system of the comparative example equipped with the engine control functions shown in FIG. 10.

FIG. 12 is a graph showing changes of the pump delivery rate with respect to the pump delivery pressure (mean value of the delivery pressures of the hydraulic pumps 1 and 2) when the mode selection command EM is issued for switchover from the standard mode, i.e., the power mode, to the economy mode in the system of the comparative example equipped with the engine control functions shown in FIG. 10. In FIG. 12, X represents a control region of the second servo valve 22 (pump absorption torque control means) of the pump regulator shown in FIG. 1, and Y represents a region where the pump delivery pressure is lower than that in the control region X.

More specifically, the relationship between the delivery pressure and delivery rate of the hydraulic pump in the construction machine, such as the hydraulic excavator, is designed such that the maximum displacement of each hydraulic pump 1, 2 is decided depending on an operating speed under a comparatively light load during, e.g., travel, swing, or midair operation (as in the region Y), and the displacement of each hydraulic pump 1, 2 at a higher level of the delivery pressure of each hydraulic pump 1, 2 is set depending on the output horsepower of the engine 10 (as in the region Y).

Further, in the general economy mode, it is prevalent to slow down the engine revolution by a certain amount regardless of the operating situation of the construction machine as described above with reference to FIG. 10. A one-dot-chain line in FIG. 12 represents changes of the pump delivery rate in that case. As seen from FIG. 12, when the economy mode is selected in the system of the comparative example, the delivery rate of the hydraulic pump is reduced in proportion to the slow-down of the engine revolution in spite of the maximum displacement being decided in consideration of the performance under the light load. Consequently, performance deterioration is caused.

Figure 13:
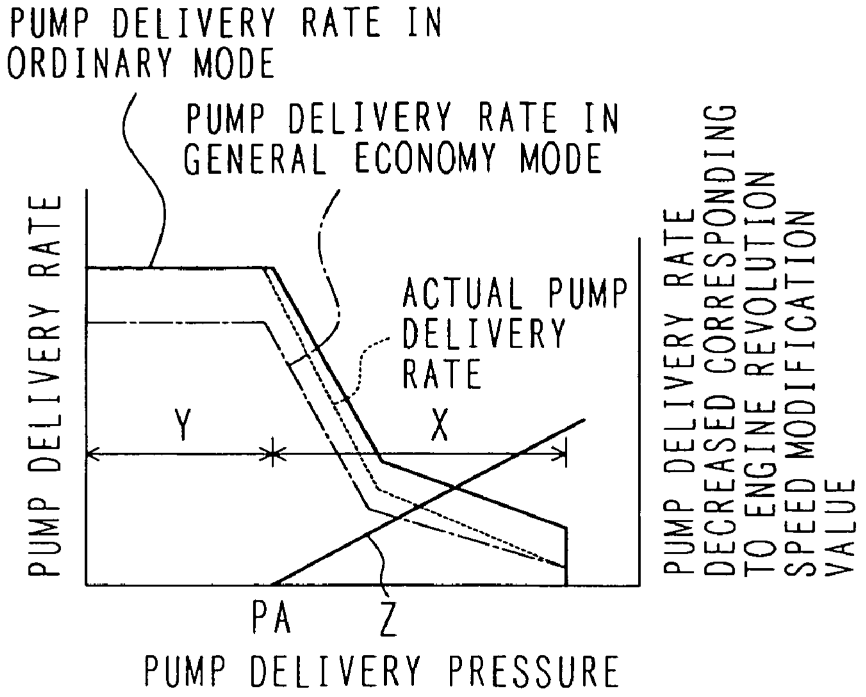
FIG. 13 is a graph showing changes of the pump delivery rate with respect to pump delivery pressure when a mode selection command EM is issued for switchover from a standard mode, i.e., a power mode, to an economy mode in the system according to the embodiment.

FIG. 13 is a graph showing changes of the pump delivery rate with respect to the pump delivery pressure (mean value of the delivery pressures of the hydraulic pumps 1 and 2) when the mode selection command EM is issued for switchover from the standard mode, i.e., the power mode, to the economy mode in the system according to the embodiment. In FIG. 13, as in FIG. 12, X represents a control region of the second servo valve 22 (pump absorption torque control means) of the pump regulator shown in FIG. 1, and Y represents a region where the pump delivery pressure is lower than that in the control region X. Also, Z denotes a characteristic line representing a decrease of the pump delivery rate corresponding to the reduction of the rated target revolution speed Nmax. For comparison, a one-dot-chain line represents changes of the pump delivery rate in the comparative example shown in FIG. 12.

Figure 14:
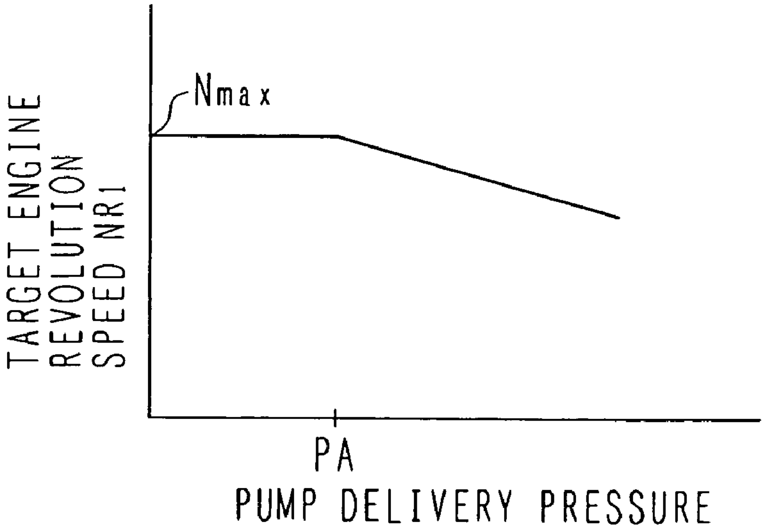
FIG. 14 is a graph showing changes of a target engine revolution speed NR1 with respect to the pump delivery pressure when the mode selection command EM is issued for switchover from the standard mode, i.e., the power mode, to the economy mode in the system according to the embodiment.

FIG. 14 is a graph showing changes of the target engine revolution speed NR1 with respect to the pump delivery pressure (mean value of the delivery pressures of the hydraulic pumps 1 and 2) when the mode selection command EM is issued for switchover from the standard mode, i.e., the power mode, to the economy mode in the system according to the embodiment.

In this embodiment, when the mode selection command EM selects the economy mode, the mode selector 700*e* shown in FIG. 8 is turned on and outputs, as the engine revolution speed modification value ΔN1, the engine revolution speed modification value ΔN0 computed by the engine-revolution-speed modification value computing section 700*d* (i.e., ΔN1=ΔN0). The subtracter 700*f* subtracts the engine revolution speed modification value ΔN1 (=ΔN0) from the rated target revolution speed Nmax, thereby computing the target engine revolution speed NR2. The minimum value selector 700*g* selects the target revolution speed NR2 and outputs it as the target engine revolution speed NR1. In the engine-revolution-speed modification value computing section 700*d*, as described above, the relationship between Pm and ΔN0 is set such that when the pump delivery pressure mean value Pm is not higher than the preset pressure PA, the engine revolution speed modification value ΔN0 is 0, and when the pump delivery pressure mean value Pm exceeds the pressure PA, the engine revolution speed modification value ΔN0 is increased with an increase of the pump delivery pressure mean value Pm.

Therefore, the target engine revolution speed NR1 is changed, as shown in FIG. 14, corresponding to the changes of the engine revolution speed modification value ΔN0 with respect to the pump delivery pressure mean value Pm. Stated another way, when the pump delivery pressure mean value Pm is not higher than the pressure PA, the target engine revolution speed NR1 is given by the rated target revolution speed Nmax, and when the pump delivery pressure mean value Pm exceeds the pressure PA, the rated target revolution speed Nmax is reduced with an increase of the pump delivery pressure mean value Pm.

As a result, when the engine control is performed with switchover from the power mode (standard mode) to the economy mode, the decrease of the delivery rate of each hydraulic pump 1, 2 is given as represented by the characteristic line Z in FIG. 13, and the delivery rate of each hydraulic pump 1, 2 is changed as represented by a dotted line in FIG. 13.

More specifically, in the region Y where the pump delivery pressure is low, i.e., where the pump delivery pressure mean value Pm is not higher than the pressure PA, the engine revolution speed is not reduced. Therefore, the decrease of the delivery rate of the hydraulic pump 1, 2 is 0 and the pump delivery rate is substantially the same as that in the standard mode. In the pump absorption torque control region X where the pump delivery pressure mean value Pm is higher than the pressure PA, the decrease of the delivery rate of the hydraulic pump 1, 2 is enlarged with the increase of the pump delivery pressure mean value Pm corresponding to the changes of the target engine revolution speed NR1 shown in FIG. 14. Thus, in a range covering the right side (higher pressure side) of the pump absorption torque control region X in FIG. 13 where the pump delivery pressure is high, the pump delivery rate is decreased substantially to the same extent as that in the related art. In a range covering the left side (lower pressure side) of the region X in FIG. 13 where the pump delivery pressure is medium, the pump delivery rate is decreased to a less extent than that in the related art depending on the level of the pump delivery pressure.

Figure 15:
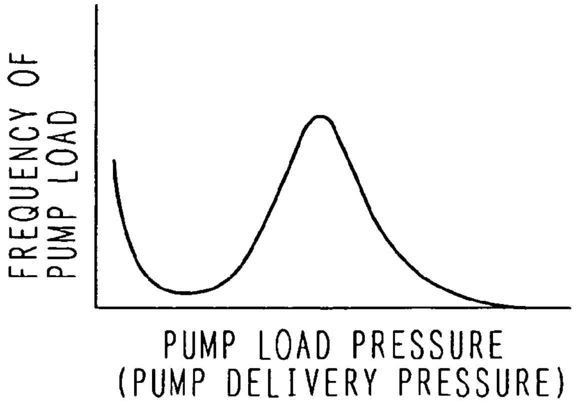
FIG. 15 is a graph showing the frequency of pump load.

FIG. 15 is a graph showing the frequency of pump load. Usually, various load conditions continuously occur in a mixed way during a series of operations of the construction machine, and the frequency of pump load can be expressed as shown in FIG. 15. Pump load pressure represented by the horizontal axis corresponds to the pump delivery pressure.

Figure 16:
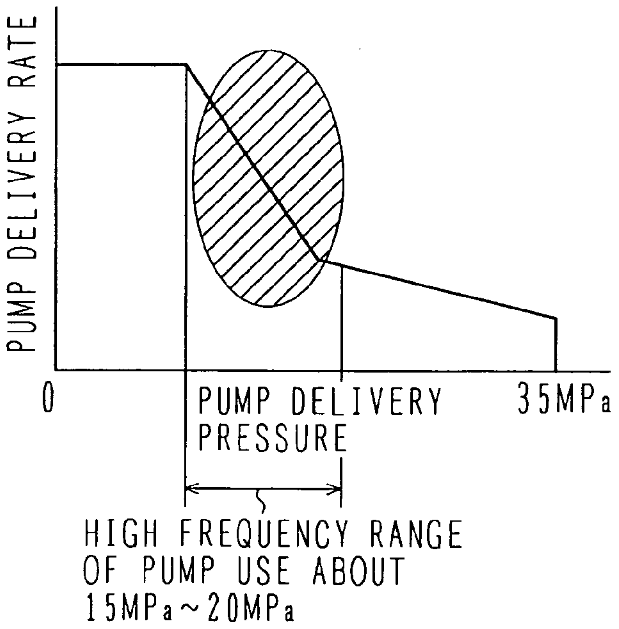
FIG. 16 is a graph showing a region of high pump load frequency in superimposed relation to a characteristic graph of the pump delivery rate.

FIG.16 is a graph showing a region of high pump load frequency in superimposed relation to a characteristic graph of the pump delivery rate. The region of high pump load frequency corresponds to the range where the pump delivery pressure is medium.

According to this embodiment, as described above, in the range of high pump delivery pressure (load), the engine revolution is controlled to be slowed down and fuel economy is improved, while in the range of low pump delivery pressure (load), work can be performed at the same pump delivery rate (operating speed) as that in the standard mode. Also, in the region of medium load where the load frequency is high, the revolution speed control can be performed in a manner capable of ensuring the satisfactory fuel economy and working speed at the same time. Stated another way, fuel economy can be improved by reducing the revolution speed of the prime mover with mode selection through the mode selection means. Further, in a required load region, performance deterioration (slow-down of the operating speed) due to a decrease of the pump delivery rate can be suppressed and working efficiency can be increased.

In addition, since the revolution speed of the prime mover is continuously changed even with changes of the load frequency during work, it is possible to avoid the operator from feeling unnatural during the operation with abrupt changes of the operating speed and variations of engine sounds, and to increase operability.

A second embodiment of the present invention will be described below with reference to FIGS. 17-19. The second embodiment differs from the first embodiment in the relationship between the pump delivery pressure mean value Pm and the engine revolution speed modification value ΔN0, which is set in the engine-revolution-speed modification value computing section 700*d* of the controller 70 shown in FIG. 8. While, in the first embodiment, that relationship is set with intent to reduce the fuel consumption at a high load and to ensure the satisfactory operating speed and fuel economy at the same time at a medium load, that relationship is set in the second embodiment with importance focused on an improvement of fuel economy at a medium load.

Figure 17:
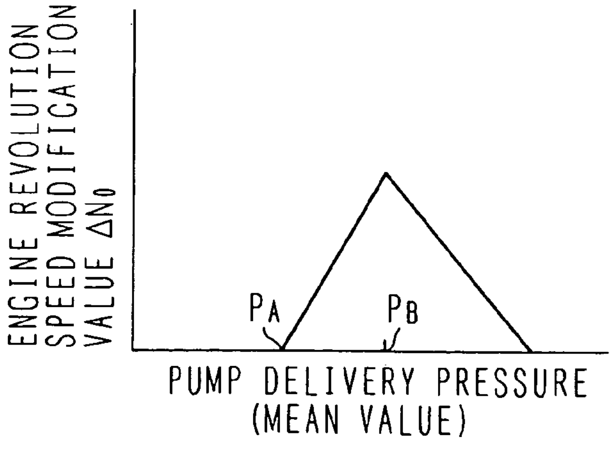
FIG. 17 is a graph showing, in enlarged scale, the relationship between the pump delivery pressure mean value Pm and the engine revolution speed modification value ΔN0, which is set in the engine-revolution-speed modification value computing section according to a second embodiment of the present invention.

FIG. 17 is a graph showing the relationship between the pump delivery pressure mean value Pm and the engine revolution speed modification value ΔN0, which is set in the engine-revolution-speed modification value computing section 700*d* according to the second embodiment. The relationship between Pm and ΔN0 is set in the table stored in the memory as follows. When the pump delivery pressure mean value Pm is not higher than the pressure PA near the midpoint, the engine revolution speed modification value ΔN0 is 0. When the pump delivery pressure mean value Pm exceeds the pressure PA, the engine revolution speed modification value ΔN0 is increased with an increase of the pump delivery pressure mean value Pm until reaching a pressure PB. When the pump delivery pressure mean value Pm exceeds the pressure PB, the engine revolution speed modification value ΔN0 is decreased with a further increase of the pump delivery pressure mean value Pm.

Based on the thus-set relationship between the pump delivery pressure mean value Pm and the engine revolution speed modification value ΔN0, the engine-revolution-speed modification value computing section 700*d* computes the engine revolution speed modification value ΔN0 corresponding to the inputted pump delivery pressure mean value Pm.

The other construction is the same as that in the first embodiment.

Figure 18:
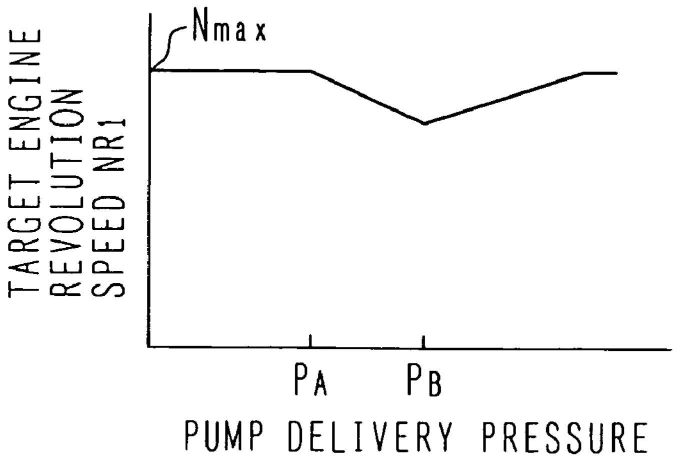
FIG. 18 is a graph showing changes of the target engine revolution speed NR1 with respect to the pump delivery pressure when the mode selection command EM is issued for switchover from the standard mode, i.e., the power mode, to the economy mode in the system according to the second embodiment.

FIG. 18 is a graph showing changes of the target engine revolution speed NR1 with respect to the pump delivery pressure (mean value of the delivery pressures of the hydraulic pumps 1 and 2) when the mode selection command EM is issued for switchover from the standard mode, i.e., the power mode, to the economy mode in the system according to the second embodiment.

Figure 19:
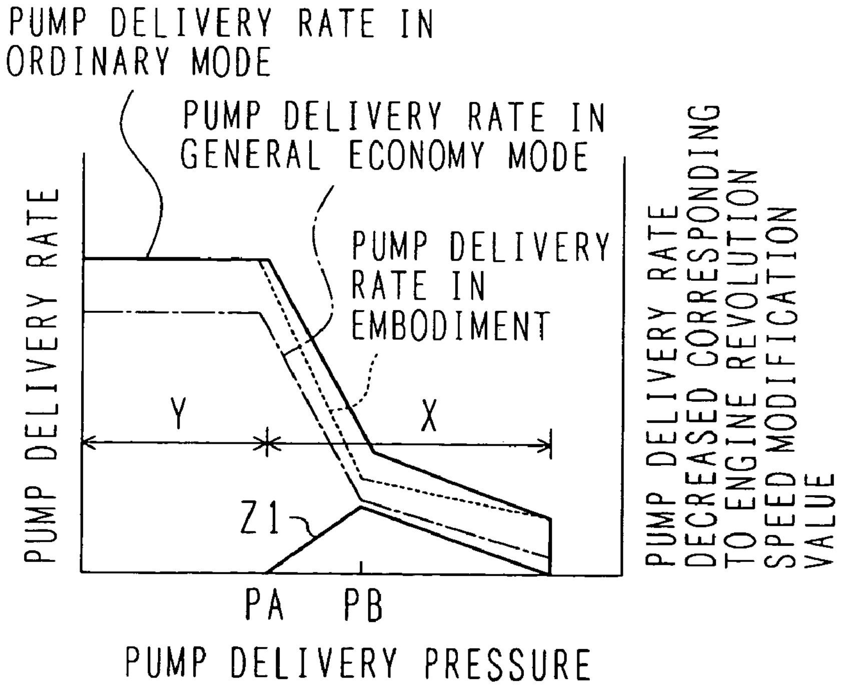
FIG. 19 is a graph showing changes of the pump delivery rate with respect to the pump delivery pressure when the mode selection command EM is issued for switchover from the standard mode, i.e., the power mode, to the economy mode in the system according to the second embodiment.

FIG. 19 is a graph showing changes of the pump delivery rate with respect to the pump delivery pressure (mean value of the delivery pressures of the hydraulic pumps 1 and 2) when the mode selection command EM is issued for switchover from the standard mode, i.e., the power mode, to the economy mode in the system according to the second embodiment. In FIG. 19, as in FIG. 13, X represents a control region of the second servo valve 22 (pump absorption torque control means) of the pump regulator shown in FIG. 1, and Y represents a region where the pump delivery pressure is lower than that in the control region X. Also, Z1 denotes a characteristic line representing a decrease of the pump delivery rate corresponding to the reduction of the rated target revolution speed Nmax. For comparison, a one-dot-chain line represents changes of the pump delivery rate in the comparative example shown in FIG. 12.

In this embodiment, when the mode selection command EM selects the economy mode, the mode selector 700*e* shown in FIG. 8 is turned on and outputs, as the engine revolution speed modification value ΔN1, the engine revolution speed modification value ΔN0 computed by the engine-revolution-speed modification value computing section 700*d* (i.e., ΔN1=ΔN0). The subtracter 700*f* subtracts the engine revolution speed modification value ΔN1 (=ΔN0) from the rated target revolution speed Nmax, thereby computing the target engine revolution speed NR2. The minimum value selector 700*g* selects the target revolution speed NR2 and outputs it as the target engine revolution speed NR1.

Therefore, the target engine revolution speed NR1 is changed, as shown in FIG. 18, corresponding to the changes of the engine revolution speed modification value ΔN0 with respect to the pump delivery pressure mean value Pm. Stated another way, when the pump delivery pressure mean value Pm is not higher than the pressure PA, the target engine revolution speed NR1 is given by the rated target revolution speed Nmax. When the pump delivery pressure mean value Pm exceeds the pressure PA, the rated target revolution speed Nmax is reduced with an increase of the pump delivery pressure mean value Pm until reaching the pressure PB. When the pump delivery pressure mean value Pm exceeds the pressure PB, the target engine revolution speed NR1 is increased with a further increase of the pump delivery pressure mean value Pm.

As a result, when the engine control is performed with switchover from the power mode (standard mode) to the economy mode, the decrease of the delivery rate of each hydraulic pump 1, 2 is given as represented by the characteristic line Z1 in FIG. 19, and the delivery rate of each hydraulic pump 1, 2 is changed as represented by a dotted line in FIG. 19. More specifically, in the region Y where the pump delivery pressure is low, i.e., where the pump delivery pressure mean value Pm is not higher than the pressure PA, the engine revolution speed is not reduced. Therefore, the decrease of the delivery rate of the hydraulic pump 1, 2 is 0 and the pump delivery rate is substantially the same as that in the standard mode. In the pump absorption torque control region X where the pump delivery pressure mean value Pm is higher than the pressure PA, the decrease of the delivery rate of the hydraulic pump 1, 2 is enlarged with the increase of the pump delivery pressure mean value Pm corresponding to the changes of the target engine revolution speed NR1 until reaching the pressure PB. When the pump delivery pressure mean value Pm exceeds the pressure PB, the decrease of the delivery rate of the hydraulic pump 1, 2 is lessened with a further increase of the pump delivery pressure mean value Pm. Thus, in a range covering the right side (higher pressure side) of the pump absorption torque control region X in FIG. 19 where the pump delivery pressure is high (particularly in a range near an upper limit of the pump delivery pressure), the pump delivery rate is substantially the same as that in the standard mode. In a range covering the left side (lower pressure side) of the region X in FIG. 19 where the pump delivery pressure is medium, the pump delivery rate is decreased depending on the level of the pump delivery pressure.

According to this embodiment, the operating speed at a low load and the operating speed (power strength) at a high load can be kept unchanged from those in the standard mode, while fuel economy can be improved at a medium load.

Thus, according to the present invention, by appropriately adjusting the setting of the target revolution speed of the prime mover with respect to the load pressure, it is possible to provide an optimum operating speed in a wide range of load conditions and to realize an improvement of fuel economy.

It is to be noted that, in any of the embodiments described above, engine revolution speed detection means may be disposed to perform feedback control for the purpose of increasing accuracy of the engine revolution control.

The invention claimed is:

1. A control system for a hydraulic construction machine comprising:

a prime mover;

at least one variable displacement hydraulic pump driven by said prime mover;

at least one hydraulic actuator driven by a hydraulic fluid from said hydraulic pump; and revolution speed control means for controlling a revolution speed of said prime mover, wherein said control system further comprises mode selection means for selecting a control mode related to said prime mover;

load pressure detection means for detecting load pressure of said hydraulic pump; and target revolution speed setting means which stores a prime mover revolution speed (ΔN0) preset therein to reduce the revolution speed of said prime mover with a rise of the load pressure of said hydraulic pump, and which, when a particular mode is selected by said mode selection means, determines a corresponding prime mover revolution speed (ΔN0) by referring to the preset prime mover revolution speed (ΔN0) based on the load pressure of the hydraulic pump detected by said load pressure detection means and sets a target revolution speed (NR1) for said revolution speed control means based on the determined prime mover revolution speed.

2. The control system for the hydraulic construction machine according to claim 1, wherein said target revolution speed setting means sets, as the target revolution speed (NR1), a rated target revolution speed (Nmax) of said prime mover when the load pressure detected by said load pressure detection means is not higher than a preset value (PA), and reduces the target revolution speed (NR1) with a rise of the load pressure when the load pressure detected by said load pressure detection means exceeds the preset value (PA).

3. The control system for the hydraulic construction machine according to claim 1, wherein said target revolution speed setting means sets, as the target revolution speed (NR1), a rated target revolution speed (Nmax) of said prime mover when the load pressure detected by said load pressure detection means is not higher than a first value (PA), reduces the target revolution speed (NR1) with a rise of the load pressure when the load pressure detected by said load pressure detection means exceeds the first value (PA), and increases the target revolution speed (NR1) to the rated target revolution speed (Nmax) with a further rise of the load pressure when the load pressure detected by said load pressure detection means exceeds a second value (PB) higher than the first value (PA).

4. The control system for the hydraulic construction machine according to claim 1, wherein said control system further comprises pump absorption torque control means for reducing a maximum displacement of said hydraulic pump with a rise of the load pressure of said hydraulic pump such that maximum absorption torque of said hydraulic pump does not exceed a setting value, and said target revolution speed setting means sets, as the target revolution speed (NR1), a revolution speed lower than the rated target revolution speed (Nmax) of said prime mover in a maximum absorption torque control region (X) of said pump absorption torque control means.

5. The control system for the hydraulic construction machine according to claim 1, wherein said target revolution speed setting means sets therein a revolution speed modification value (ΔN0) as the preset prime mover revolution speed, determines a corresponding revolution speed modification value (ΔN0) by referring to the preset revolution speed modification value (ΔN0) based on the load pressure detected by said load pressure detection means, and obtains the target revolution speed (NR1) based on the determined revolution speed modification value.

6. The control system for the hydraulic construction machine according to claim 1, wherein said target revolution speed setting means comprises:

first means for computing the revolution speed modification value (ΔN0) when the load pressure detected by said load pressure detection means exceeds the first value (PA); and second means for subtracting the revolution speed modification value ($\Delta N0$) from the rated target revolution speed (Nmax) of said prime mover, thereby computing the target revolution speed (NR1).

7. The control system for the hydraulic construction machine according to claim 6, wherein said target revolution speed setting means further comprises third means for invalidating the subtraction executed by said second means when a mode other than the particular mode is selected by said mode selection means, and for validating the subtraction executed by said second means when the particular mode is selected.

8. The control system for the hydraulic construction machine according to claim 6, wherein said control system further comprises pump absorption torque control means for reducing a maximum displacement of said hydraulic pump with a rise of the load pressure of said hydraulic pump when the load pressure of said hydraulic pump becomes higher than a third value, such that maximum absorption torque of said hydraulic pump does not exceed a setting value, and the first value (PA) is set close to the third value.

* * * * *